(12) United States Patent
Takagi et al.

(10) Patent No.: US 6,943,318 B2
(45) Date of Patent: Sep. 13, 2005

(54) WELDING TIP FOR ARC WELDING AND ARC WELDING APPARATUS

(75) Inventors: Ryuuhei Takagi, Aichi (JP); Akio Uenaka, Aichi (JP); Hiroaki Suzuki, Aichi (JP); Keiichiro Kagawa, Aichi (JP); Yasuyuki Tsukahara, Aichi (JP)

(73) Assignee: Daido Tokushuko Kabushiki Kaisha, Nagoya (JP)

( * ) Notice: Subject to any disclaimer, the term of this patent is extended or adjusted under 35 U.S.C. 154(b) by 52 days.

(21) Appl. No.: 10/167,374

(22) Filed: Jun. 11, 2002

(65) Prior Publication Data

US 2003/0019857 A1 Jan. 30, 2003

(30) Foreign Application Priority Data

Jun. 14, 2001 (JP) ........................ 2001-180216
Sep. 28, 2001 (JP) ........................ 2001-303551
Mar. 25, 2002 (JP) ........................ 2002-083502

(51) Int. Cl.$^7$ .............................................. B23K 9/26
(52) U.S. Cl. .............................. 219/137.61; 219/137.62
(58) Field of Search ........................ 219/137.61, 137.62

(56) References Cited

U.S. PATENT DOCUMENTS

| | | | | |
|---|---|---|---|---|
| 2,756,310 A | * | 7/1956 | Galbraith | ............... 219/137.52 |
| 2,765,310 A | * | 10/1956 | Horrobin | .................... 546/252 |
| 2,768,280 A | * | 10/1956 | Renandie | ............... 219/137.42 |
| 3,283,121 A | * | 11/1966 | Bernard et al. | ........ 219/137.44 |
| 3,502,841 A | | 3/1970 | Heer | |
| 3,878,354 A | * | 4/1975 | Frantzreb, Sr. | ............... 219/74 |

FOREIGN PATENT DOCUMENTS

CH 421 340 A 9/1966

OTHER PUBLICATIONS

Patent Abstracts of Japan, vol. 018, No. 023, (M–1541), Jan. 14, 1994 and JP 05–261551 A (Kobe Steel Co.), Oct. 12, 1993—Abstract only.
Patent Abstracts of Japan, vol. 1995, No. 07, Aug. 31, 1995 and JP 07–100653 A (Nagamine Seisakusho KK), Apr. 18, 1995—Abstract only.
Patent Abstracts of Japan, vol. 1996, No. 12. Dec. 26, 1996 and JP 08–215855 A (NGK Insulators Ltd.), Aug. 27, 1996—Abstract only.
Patent Abstracts of Japan, vol. 1997, No. 08, Aug. 29, 1997 and JP 09–094667 A (Yaskawa Electronic Corp.), Apr. 8, 1997—Abstract only.
Patent Abstracts of Japan, vol. 2000, No. 22, Mar. 9, 2001 and JP 2001–121265 A (Daido Steel Co. Ltd.), May 8, 2001—Abstract only.

* cited by examiner

Primary Examiner—Kiley S. Stoner
Assistant Examiner—Len Tran
(74) Attorney, Agent, or Firm—Frishauf, Holtz, Goodman & Chick, P.C.

(57) ABSTRACT

A contact provided in a welding tip of an arc welding apparatus includes a tip body adapted to be mounted to a welding torch body and a tip end member formed integrally therewith. The tip end member is divided into two parts, i.e., first and second halves by means of a slit formed along the axis of the tip end member, and the first half having the predetermined rigidity is movable around a connection between itself and the tip body. A spring member fitted on the tip end member applies a spring force thereto, whereby the contact has improved durability.

31 Claims, 28 Drawing Sheets

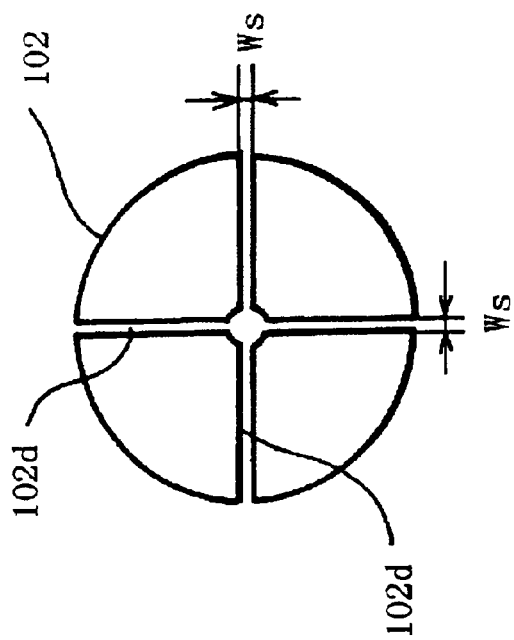
F I G. 14
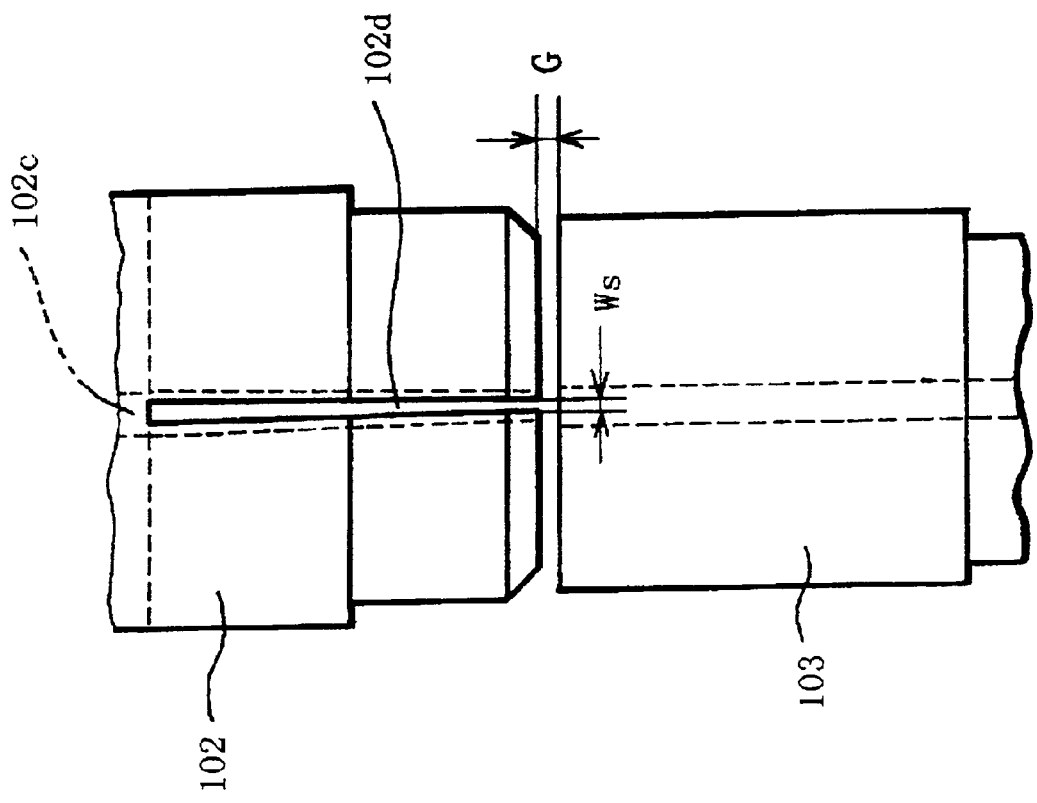
F I G. 13

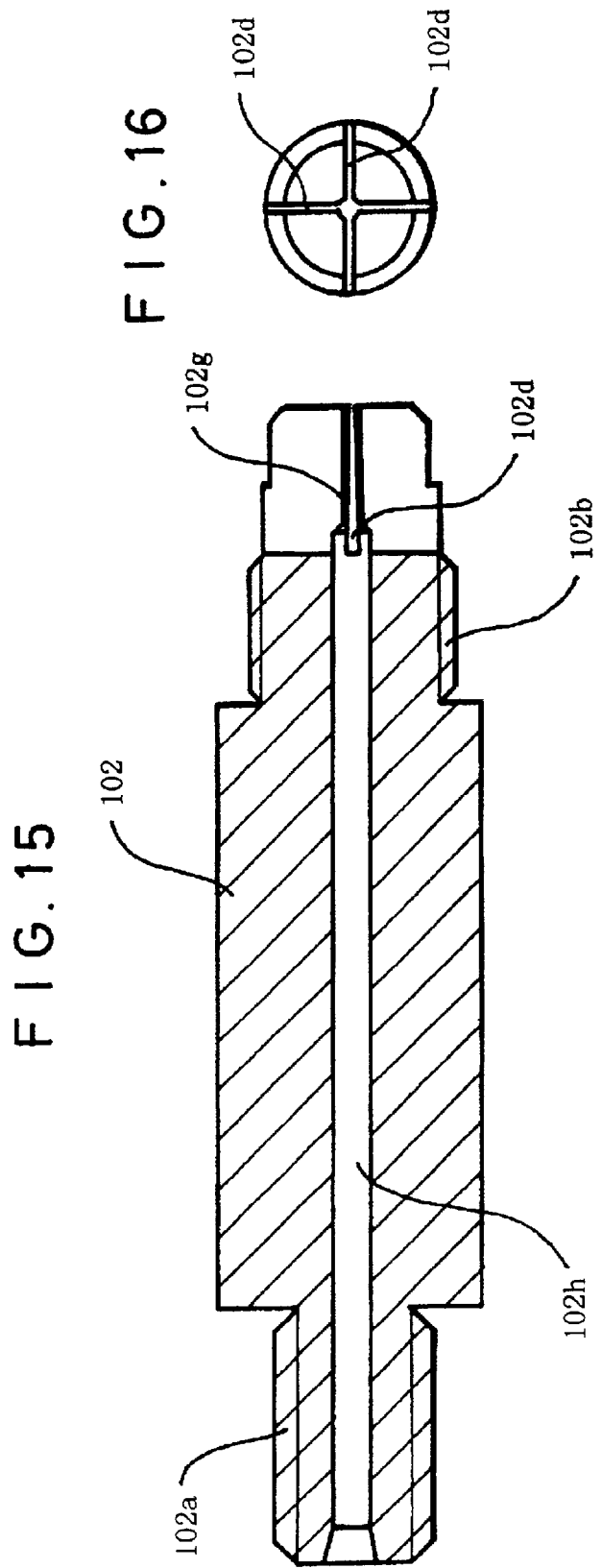

WELDING TIP FOR ARC WELDING AND ARC WELDING APPARATUS

BACKGROUND OF THE INVENTION

1. Technical Field

The present invention relates to a welding tip for arc welding that includes a contact having an insulating guide which serves to increase a wire extension length measured from a contact point, and a metal guide which accommodates therein the insulating guide. More particularly, the present invention relates to a welding tip capable of maintaining a stable electric contact between a contact and a welding wire to stably generate arc between the welding wire and a base material, and relates to an arc welding apparatus provided with a welding tip of this kind.

2. Related Art

An arc welding apparatus is configured to feed a welding wire from a wire supplying apparatus toward a contact of a welding tip mounted to a welding torch and to supply welding current to the welding wire through the contact, whereby welding is performed by utilizing arc heat produced between a base material and the welding wire.

A consumable electrode type gas shielded arc welding, which belongs to arc welding, is performed with use of energy produced by arc that is generated between a base material and a continuously supplied welding wire, while enveloping the arc by a shield gas which is carbon dioxide gas, argon gas, or a mixture thereof. Arc welding of this kind is widely employed for the automatic or semi-automatic welding of thin plates, such as suspension component welding performed by welding robots in automotive industry.

In consumable electrode type gas shielded arc welding, an amount of fused welding wire increases with the increase in welding current, and therefore, the welding current is increased in order to improve the fusing speed of the welding wire or the welding speed. On the other hand, the increased welding current can increase a weld penetration depth in a base metal, resulting in burn-through in the thin plate welding. To obviate this, it is proposed to mount an insulating guide of a heat-resistant insulating material such as ceramic to a distal end of a contact through which the welding current is supplied to a welding wire, in order to increase the wire extension length, i.e., the distance between the welding tip and the base metal, thereby increasing Joule heating in a wire portion corresponding to the wire extension length. By doing this, an amount of fused wire increases, so that the welding speed may be improved while preventing the burn-through of the base material.

However, a welding torch having an insulating guide at a distal end of a contact cannot maintain a constant contact point, i.e., a constant feeding point between the welding wire and the contact, causing unstable power supply which results in an unstable arc.

As for a welding torch having no insulating guide, a welding wire having a habit of being curled can freely be bent after passing a wire insertion hole formed in a contact, and is thus positively in contact with the contact at an extreme end of the wire insertion hole, whereby stable power supply can be achieved. Contrary to this, in a welding tip having an insulating guide provided at a distal end of a contact, a welding wire is prevented from being freely bent at the extreme end of the contact and is prohibited to be freely bent until it passes through the insulating guide. Thus, the welding wire is prevented from contacting with the extreme end of the contact. This makes the contact point unstable and hence the power supply tends to be unstable. Further, such a variation in contact point causes local fusion of the feeding tip and the formation of an oxide layer therein, so that the contact is liable to be consumed. Though a relatively stable arc is obtainable at an early stage of usage of the contact, the arc becomes unstable with the advance of the contact being consumed.

FIG. 1 shows an example of a welding tip for arc welding that includes an insulating guide, having a central portion thereof formed with a guide hole for guiding a welding wire, and a metal guide for holding therein the insulating guide.

The welding tip shown in FIG. 1 includes a contact 200 having a male thread portion 202 thereof threadedly engaged with a female thread portion 206 of a welding torch body 204. The contact 200 is formed with a feeder hole 216 at which the contact is in contacts with a welding wire W and electric power is supplied to the wire. The welding tip further includes a cylindrical metal guide 210 having a female thread portion 212 thereof threadedly engaged with a male thread portion 214 of the contact 200. Further, a cylindrical ceramic insulating guide 218 is retained inside the metal guide 210 and formed with a guide hole 220 for guiding the welding wire W. In FIG. 1, reference numeral 208 denotes a conduit tube inserted into the welding torch body 204, and symbol A denotes an arc generated between the welding wire W and a base material.

The welding tip shown in FIG. 1 can increase the extension length of the welding wire W since the contact 200 is provided at its distal end with the metal guide 210 and the insulating guide 219. The increased wire extension length can increase an amount of heat ($I^2R$) generated by electric current flowing through the tip end portion of the welding wire A, which portion extends from the contact point (feeding point) between the welding wire and the contact 200. Therefore, the tip end portion of the welding wire W becomes higher in temperature, making it possible to reduce an amount of energy to be supplied to the welding wire W.

However, the contact 200 provided at its distal end with the insulating guide 218 entails such a drawback that the contact point relative to the wire W becomes unstable. Contrary to an arc welding apparatus where the insulating guide is omitted and the contact point can be kept constant by utilizing the habit of the welding wire being freely bent, the insulating guide 218 provided at the distal end of the contact 200 prevents the welding wire W from being bent just after passing the contact 200, and as a result the contact point between the welding wire W and the contact 200 becomes unstable.

For a satisfactory arc welding, the welding wire portion on the distal end side with respect to the contact point must be heated constantly, with the wire extension length, i.e., the position of the contact point kept constant, however, the welding tip shown in FIG. 1 is insufficient in regard to this point.

In an attempt to stabilize the contact point, the present inventors fabricated a welding tip having a contact 200 whose feeder hole 216 was smaller in diameter (for instance, about 1.23 mm for the wire diameter of 1.20 mm), and carried out arc welding tests thereon, but no satisfactory results could be obtained. It is considered that this is because the feeder hole 216 was worn out early with the passage of the welding wire W therethrough, even though the feeder hole 216 was originally in contact with the welding wire at a constant position.

Thus, the present inventors created an arc welding apparatus in which the feeder hole 216 extended obliquely as shown in FIG. 3. However, such an arrangement cannot sufficiently stabilize the contact point. It is considered that this is because of the following reasons.

To attain a reliable contact between the extreme end of the feeder hole 216 and the welding wire W, the feeder hole 216 must be formed to extend obliquely at a relatively large angle, resulting in a large resistance force at the feeder hole 216 when the welding wire W passes therethrough, thus making it impossible to attain smooth wire supply. Since the welding wire W has a certain rigidity, moreover, the passage of the welding wire causes the extreme end of the feeder hole 216 to be worn out, and hence an urging contact between the extreme end of the feeder hole 216 and the welding wire W is gradually weakened. Furthermore, since the welding wire W is bent steeply at the feeder hole 216, the welding wire portion on the distal end side with respect to the feeder hole 216 gives a significant impact on the insulating guide 218 of ceramic, which impact can be large enough to break the insulating guide. If the oblique angle at which the feeder hole 216 extends is decreased in an attempt to eliminate the aforementioned inconveniences, the contact between the feeder hole 216 and the welding wire W becomes unstable, as in the case of the feeder hole 216 shown in FIG. 1.

As explained in the above, unstable arc is caused by instability in the contact point at which the welding wire is in contact with the feeder. The instability of arc becomes noticeable as the contact being worn out due to friction between the contact and the welding wire.

Another problem is caused by chippings produced while the welding wire passes through the contact. Specifically, such chippings accumulate in the wire insertion hole formed in the welding tip to hinder smooth wire supply.

Moreover, the arc welding apparatus shown in FIGS. 1–3 entails the following problems. Specifically, in an arc welding apparatus having the insulating guide 218 whose distal end is positioned at an axial position short of the distal end of the metal guide 210, spatter S dispersing during the welding adheres to inside the metal guide 210 and further spatter S adheres to the spatter already adhered to the metal guide, as shown in FIG. 4. Thus, the spatter gradually develops and finally narrows or clogs the distal end opening formed in the guide hole 220 of the insulating guide 218, casing a wire supply failure. In addition, gas shielding is deteriorated to permit pits and blow holes to be produced in a weldment.

For the above-mentioned reasons, a welding tip for arc welding is demanded that is capable of achieving stable power supply to a welding wire to produce a stable arc and that is excellent in durability and has a long service life. To achieve smooth wire supply, moreover, accumulation of chippings in a welding tip and adherence of spatter to an insulating guide and a metal guide of a welding tip must be prevented or reduced.

SUMMARY OF THE INVENTION

An object of the present invention is to provide a welding tip for arc welding capable of producing a stable arc and permitting a contact to have an improved durability and to provide an arc welding apparatus comprising a welding tip of this kind.

Another object of the present invention is to provide a welding tip for arc welding capable of reducing accumulation of chippings therein and an arc welding apparatus comprising such a welding tip.

Still another object of the present invention is to prove a welding tip for arc welding capable of preventing spatter from adhering thereto and an arc welding apparatus having such a welding tip.

According to one aspect of the present invention, a welding tip for arc welding is provided, which includes a contact formed with a wire insertion hole permitting a welding wire to pass therethrough and adapted to be mounted to a welding torch body, a metal guide mounted to a distal end of the contact, and an insulating guide accommodated in the metal guide and formed with a wire guide hole permitting the welding wire to pass therethrough. In the welding tip, the contact is comprised of a tip body adapted to be mounted to the welding torch body and a tip end member formed integrally with the tip body. The tip end member is divided into at least first and second parts by means of a slit formed along an axis of the tip end member over the entire length thereof and communicating with the wire insertion hole. The welding tip comprises a spring member fitted on the tip end member of the contact and serving to apply a spring force to the tip end member.

According the welding tip, the tip end member of the contact can be tightened in the direction of decreasing its diameter by means of the spring member and the tip end member can be divided into at least two parts (e.g., divided into two parts or four parts) by means of the slit formed along the axis of the tip end member, thereby proving the tip end member with an ability of being deformed in a direction perpendicular to the axis of the tip end member. As a result, the durability of the contact can be improved, and the welding wire is permitted to contact with the contact with an optimal contact pressure, whereby stable power supply and stable arc welding can be achieved.

Preferably, the spring member is constituted by a plate spring formed into a cylindrical shape.

With this preferred embodiment, the spring member constituted by a plate spring is permitted to contact with an outer periphery of the contact with a broad area, i.e., with a large friction force. Accordingly, the spring member can be properly held, without the need of forming a peripheral groove in the outer periphery of the contact for receiving the spring member. By using such a spring member, moreover, a sufficient tightening force can be applied to the contact in the direction of decreasing the diameter of the contact.

More preferably, the contact is formed at its outer periphery with a wall which projects to form an abutment face thereof on a distal end side with respect to the spring member, and a distal end face of the spring member is abutted against the wall.

With this preferred embodiment, the spring member is positively prevented from being detached from the contact.

Preferably, the distal end of the insulating guide projects from the distal end of the metal guide. More preferably, the projection length of the insulating guide varies from 0.5 mm to 2.0 mm.

With these preferred embodiments, spatter that disperses during the welding does not adhere to the contact since the distal end of the insulating guide projects from the distal end of the metal guide, thereby eliminating a problem of adherence of spatter that narrows or clogs an opening formed in the distal end of the insulating guide to cause a wire supply failure and a problem of deteriorated gas shielding that promotes occurrences of pits and blow holes in a weldment. By setting the extension length within a range from 0.5 mm to 2.0 mm, satisfactory arc welding can be achieved. Specifically, the insulating guide projecting from the metal guide cannot sufficiently exhibit its advantageous effect, if the extension length is less than 0.5 mm, whereas, if the extension length is larger than 2.0 mm, the insulating guide is disposed too close to the arc whose heat can break the insulating guide.

Although a stable contact is achieved between the welding wire and the contact by using the contact having a tip end member which is formed with a slit and which has a radial deformability, there is a fear that foreign matter, mainly constituted by weld fume, may enter from arc side through the insulating guide and chippings, e.g., peeling off from a plating film of the welding wire may enter from wire supply side and accumulate in the slit, preventing the contact from being elastically deformed in the direction of narrowing the slit width. As a result, the contact loses its deformability and a pressing force acting on the welding wire decreases, thus deteriorating the durability of the contact and the stability of arc.

With the intention of ensuring satisfactory power supply to stabilize arc welding when using a welding tip having a contact and an insulating guide serving to increase the wire extension length for improvement of welding efficiency, the present inventors made extensive experiments on the contact to find suitable shape and size, suitable machining method and required machining accuracy thereof. As a result, requirements for ensuring a satisfactory arc for a long time, i.e., a suitable range of wire withdrawal resistance in the contact, and a suitable relationship between the slit width and the clearance between the contact and the insulating guide enough to prevent intrusion of weld fume and chippings into the slit could be determined. On the basis of these findings, the following welding tip has been created.

According to another aspect of the present invention, a welding tip for arc welding is provided that has a contact formed with a wire insertion hole which permits a welding wire to pass therethrough and adapted to be mounted to a welding torch body, a metal guide mounted to a distal end of the contact, and an insulating guide accommodated in the metal guide and formed with a wire guide hole which permits the welding wire to pass therethrough. In the welding tip, the contact is comprised of a tip body adapted to be mounted to the welding torch body and a tip end member formed integrally with the tip body. The tip end member is divided into at least first and second parts by means of a slit formed along an axis of the tip end member over the entire length thereof and communicating with the wire insertion hole. The welding tip comprises a spring member fitted on the tip end member of the contact and applying a spring force to the tip end member. The spring member permits the slit to have a distal end width thereof less than 0.3 D, where D represents a welding wire diameter. The wire withdrawal resistance F varies within a range from 10 D to 2000 D inclusive. The insulating guide is disposed to close to or in contact with the contact so as not to permit weld fume to enter.

Preferably, a clearance equal to or less than 0.1 D is formed between the contact and the insulating guide.

According to this invention, the contact is comprised of the tip end member provided with the spring member and producing a wire withdrawal resistance varying from 100 D to 2000 D, with the slit end width being equal to or less than 0.3 D and the clearance between the contact and the insulating guide being equal to or less than 0.1 D, so that the contact is disposed close to or in contact with the insulating guide to thereby prevent the intrusion of weld fume. Thus, power supply from the contact to the welding wire is ensured, accumulation of weld fume in the slit is prevented, and a stable arc is maintained for a long time, resulting in improved durability.

Preferably, the wire insertion hole of the contact has a stepped structure that is comprised of a small-diameter portion located on a side close to the insulating guide and having an inner diameter thereof substantially equal to a welding wire diameter, and a large-diameter portion located on a side remote from the insulating guide, having an inner diameter thereof larger than that of the small-diameter portion, and extending to a proximal end of the slit.

With this preferred embodiment, the contact has a wire insertion hole of a stepped structure comprised of the small-diameter portion and the large-diameter portion extending to the proximal end of the slit formed in the contact. Even if foreign matter such as plated-layer chipping enters into the wire insertion hole together with the welding wire, such foreign matter is easily discharged to be prevented from entering into the distal end of the contact serving as a feeding section. Thus, a wire supply failure can be prevented to maintain a stable welding state for a long time.

According to another aspect of the present invention, an arc welding apparatus, e.g., a consumable electrode type gas shielded arc welding apparatus, is provided that comprises the welding tip having the above-mentioned construction.

The arc welding apparatus of this invention comprises the aforementioned welding tip, and hence power supply to a welding wire can be stabilized to continuously perform stable welding. Thus, the frequency of welding tip replacement can be greatly reduced. Furthermore, the run-out or concentricity offset of the welding wire per 10 mm of wire extension length can be suppressed to be equal to or less than 0.5 D (mm), where D (mm) represents the welding wire diameter. Thus, a positional dislocation in welding and snaking of a weld bead can be prevented, thereby greatly improving the appearance and dimensional accuracy of a weldment.

According to still another aspect of this invention, there is provided a welding tip that includes a contact formed with a wire insertion hole which permits a welding wire to pass therethrough and adapted to be mounted to a welding torch body, a metal guide mounted to a distal end of the contact, and an insulating guide accommodated in the metal guide and formed with a wire guide hole which permits the welding wire to pass therethrough. In the welding tip, the contact is comprised of a tip body adapted to be mounted to the welding torch body and a tip end member formed integrally therewith. The tip end member is divided into at least first and second parts by means of a slit formed along an axis of the tip end member over the entire length thereof and communicating with the wire insertion hole. The first part has predetermined rigidity and is movable around a connection between itself and the tip body. The welding tip comprises a spring member fitted on the tip end member of the contact and applying a spring force to the tip end member.

According to the welding tip of this invention, since the first part of the tip end member has predetermined rigidity and arranged to be movable and the tip end member is always applied with a spring force produced by the spring member, a contact between the contact and the welding wire is ensured even when the contact is considerably worn out as the welding wire passes through the wire insertion hole of the contact, whereby the position of the contact point is stabilized. Accordingly, a stable arc and improved durability of the contact can be attained. Furthermore, a deposit in the wire insertion hole of the contact is discharged through the slit that communicates with the wire insertion hole, thereby reducing a fear that wire supply is prevented by accumulated deposits.

Preferably, the tip end member of the contact consists of first and second parts, and the second part has predetermined rigidity and is arranged to be movable around a connection between itself and the tip body.

With the welding tip according to the just-mentioned preferred embodiment, the tip end member of the contact is simply divided into two parts, and accordingly the contact can be fabricated easily as compared to a case where it is divided into three or more parts. For instance, the tip end member can be divided into the first and second parts, by forming a slit along the axis of the tip end member that is comprised of a plate portion formed integrally with the tip body and a cylindrical portion formed integrally with the plate portion. Since the first and second parts of the tip end member have their predetermined rigidity in the contact of the preferred embodiment, a proper contact force is maintained between the contact and the welding wire by the action of the spring member, even when the contact is considerably worn out, whereby a stable arc and improved durability of the contact can be attained.

Preferably, in the welding tip, the first part of the tip end member has rigidity that varies within a range from 3.92 N to 39.2 N inclusive. Alternatively, the first and second parts of the tip end member each have rigidity varying within a range from 3.92N to 39.2 N inclusive.

With the welding tip according to each of these preferred embodiments, even when the contact is considerably worn out, the first part or the first and second parts of the tip end member is or are in contact with the welding wire with a proper force with the aid of the spring force produced by the spring member. That is, if the rigidity of the first part or each of the first and second parts has excessively small rigidity, the contact is in contact with the welding wire with an excessive force under the action of the spring member to produce heat. On the other hand, if the rigidity is too large, a contact failure is caused between the contact and the welding wire when the contact is worn out, so that unstable power supply or power supply failure may be caused. According to the preferred embodiments, such drawbacks can be eliminated, since the first or second part of the tip end member of the contact has rigidity falling within a proper range. The contact also has the desired mechanical strength and is mechanically machinable. On the contrary, in the case of the tip end member having excessively small rigidity, the connection between the first or second part of the contact and the tip body thereof is small in cross sectional area, thus lowering the mechanical strength and posing a difficulty in machining.

Preferably, in the welding tip, a discharge hole is formed in an upstream portion of the first part of the tip end member as viewed in the welding wire supplying direction. Alternatively, discharge holes are provided at upstream portions of the first and second parts of the tip end member as viewed in the welding wire supplying direction.

With the welding tip of each of the just-mentioned preferred embodiments, deposits in the wire insertion hole formed in the contact are discharged to the outside of the contact through the discharge hole or holes formed in the first part or the first and second parts as the welding wire passes through the wire insertion hole, whereby smooth wire supply is ensured.

Preferably, in the welding tip, the wire insertion hole is provided with a taper portion on a downstream side of the discharge hole, which portion has a diameter that becomes smaller toward the downstream side in the welding wire supplying direction.

With the welding tip according to this preferred embodiment, the wire insertion hole of the contact formed on the upstream side of the taper portion may have a large diameter to thereby suppress the wearout of the contact caused by the welding wire passing therethrough, and on the other hand, the wire insertion hole may have a smaller diameter on the downstream side of the taper portion to thereby suppress a positional variation of the contact point and the run-out or concentricity offset of the welding wire. By making the wire insertion hole on the downstream side of the taper portion to have a diameter smaller than the welding wire diameter, the function of suppressing the positional variation of the contact point and the run-out of the welding wire can be enhanced. In this case, the welding wire passes through the wire insertion hole defined between the first and second parts of the tip end member of the contact, while pressing at least the first part of the tip end member in the radially outward direction. As a result, the contact is in contact with the welding wire with a proper pressure, so that the welding wire withdrawal resistance may be proper one, thus achieving smooth wire supply.

Preferably, in the welding tip, a taper angle at the taper portion of the wire insertion hole of the contact is equal to or less than 45 degrees.

Although the wire insertion hole for ordinary use can be easily formed by setting the taper angle to 60 degrees, the discharging of deposits from the discharge hole can be promoted by setting the taper angle equal to or less than 45 degrees.

According to another aspect of this invention, there is provided a welding apparatus which comprises a welding torch having a welding torch body mounted with the aforesaid welding tip, a wire feeding apparatus for supplying a welding wire to the welding torch, and a weld power source for supplying a contact of the welding tip with electric power.

According to the arc welding apparatus of this invention, the above-described advantages are achieved by the welding tip provided in the arc welding apparatus. The arc welding apparatus may be configured as a semi-automatic type whose welding torch is held by an operator, or as an automatic type whose welding torch, wire feeding apparatus and weld power source are mounted to a traveling carriage, or as a weld robot having a robot hand to which the welding torch is mounted. The arc welding apparatus may be configured as a gas shielded type in which a shield gas is supplied between the welding tip and a nozzle arranged to surround the welding tip, or a non gas-shielded type in which no shield gas is used.

BRIEF DESCRIPTION OF THE DRAWINGS

FIG. 13 is an enlarged view for explaining a contact and an insulating guide of the welding tip shown in FIG. 11;

FIG. 14 is an end view of a distal end of the contact shown in FIG. 13;

FIG. 15 is a section view of a contact according to a modification of the second embodiment of the present invention;

FIG. 16 is an end view of the contact shown in FIG. 15;

DETAILED DESCRIPTION

With reference to FIGS. 6–9, an arc welding apparatus having a welding tip according to a first embodiment of this invention will be explained.

Figure 1:
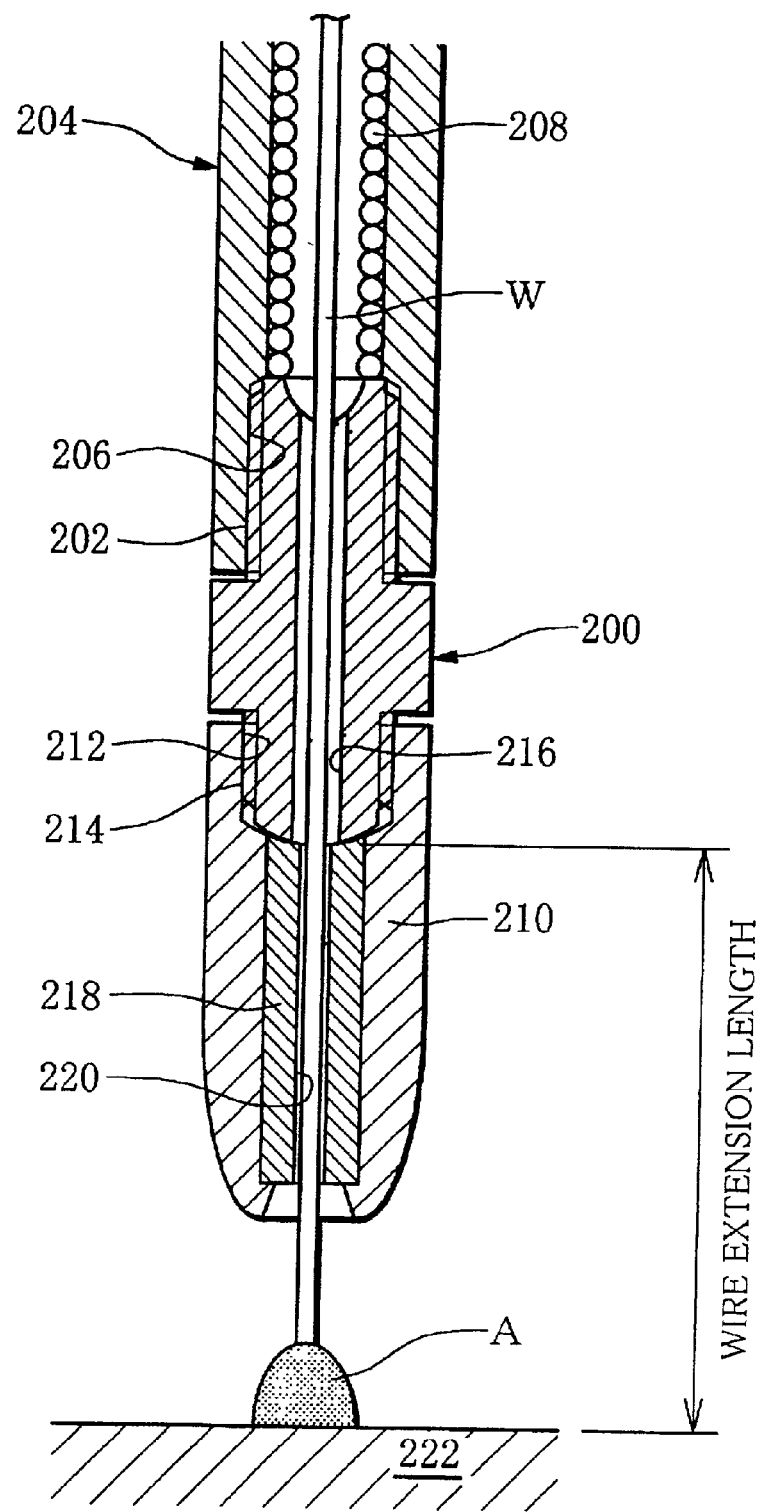
FIG. 1 is a fragmentary vertical section view showing an example of a conventional welding tip.
Figure 2:
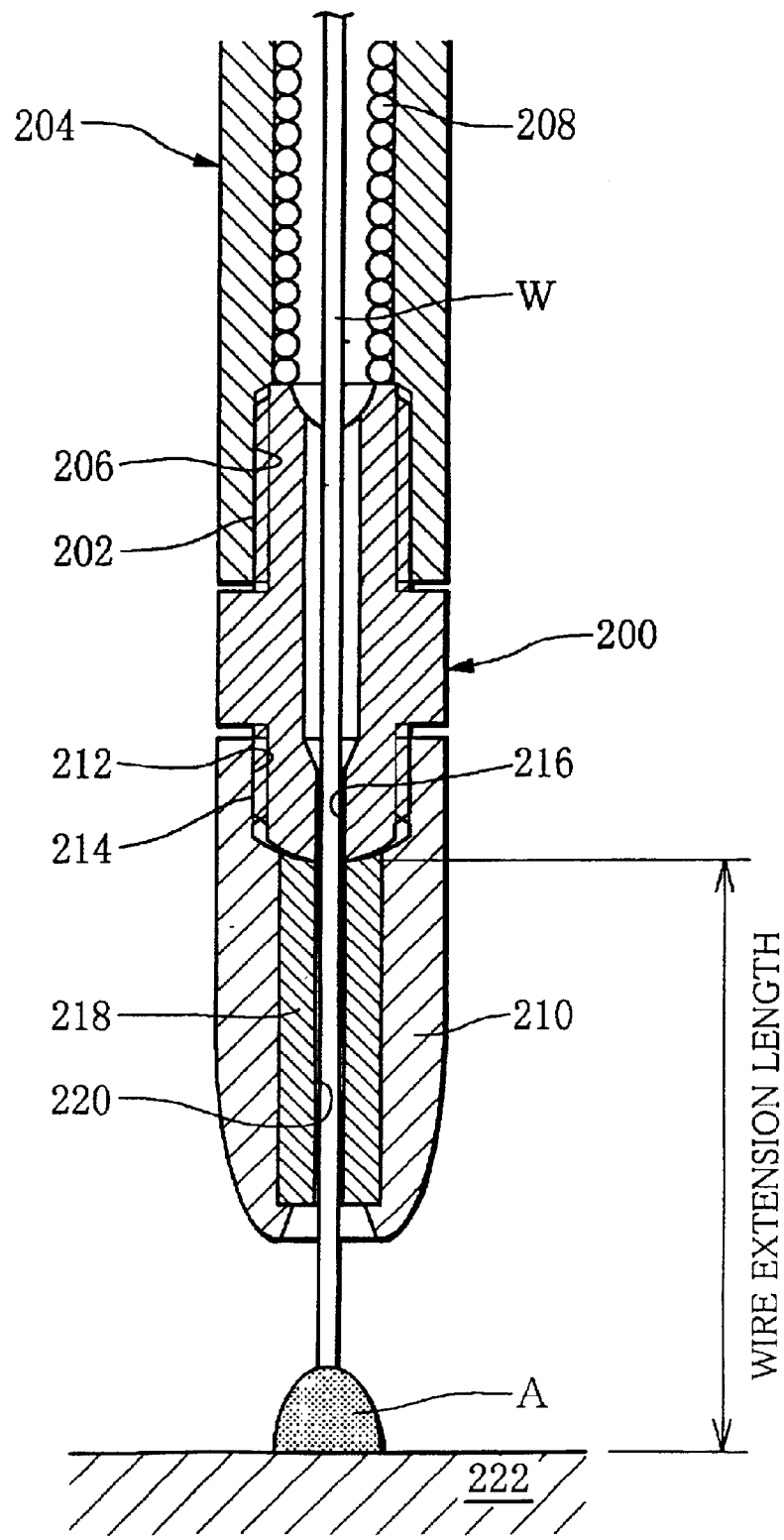
FIG. 2 is a fragmentary vertical section view showing a proposed modification of the welding tip shown in FIG. 1.
Figure 3:
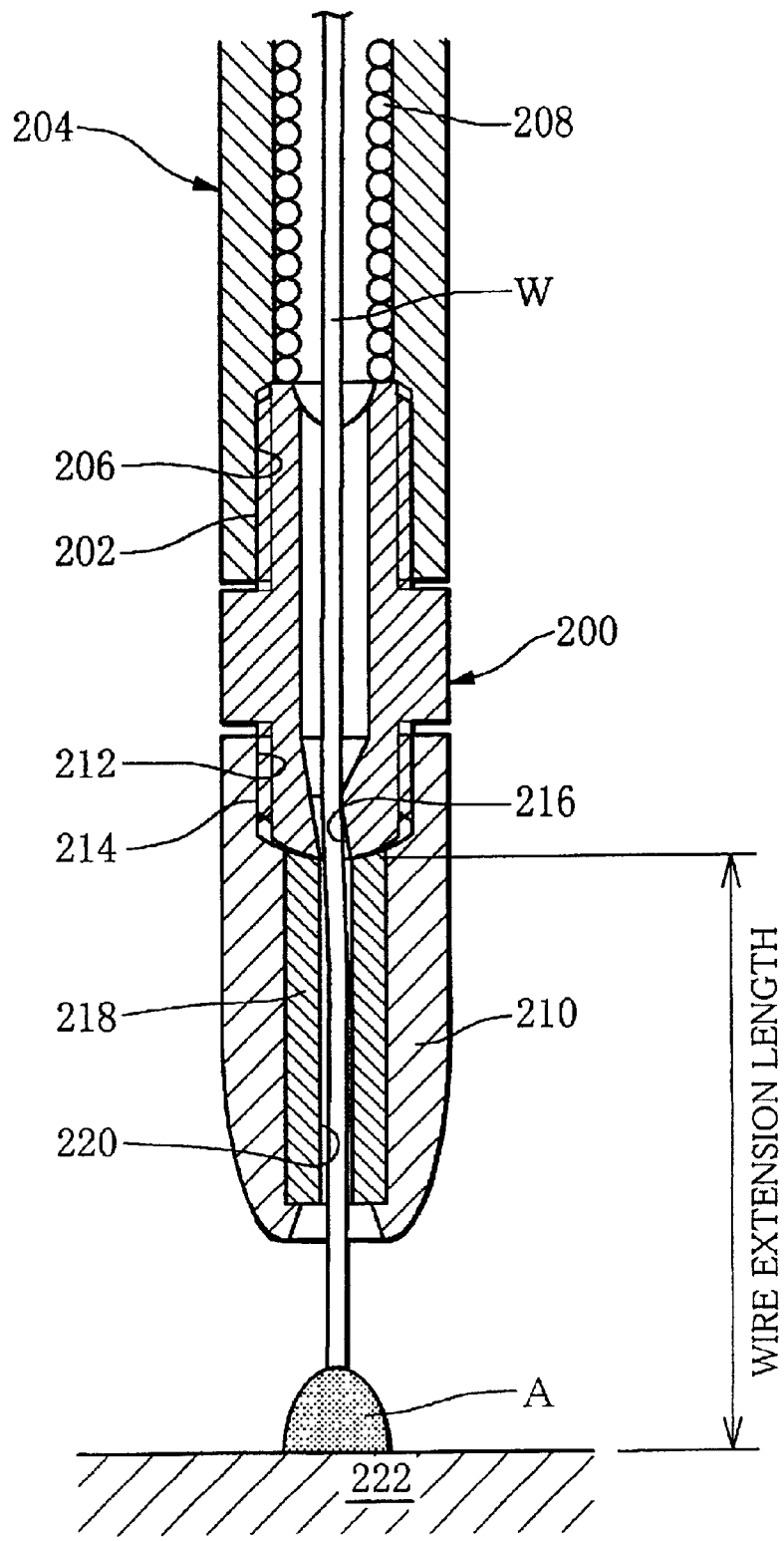
FIG. 3 is a fragmentary vertical section view showing another modification.
Figure 4:
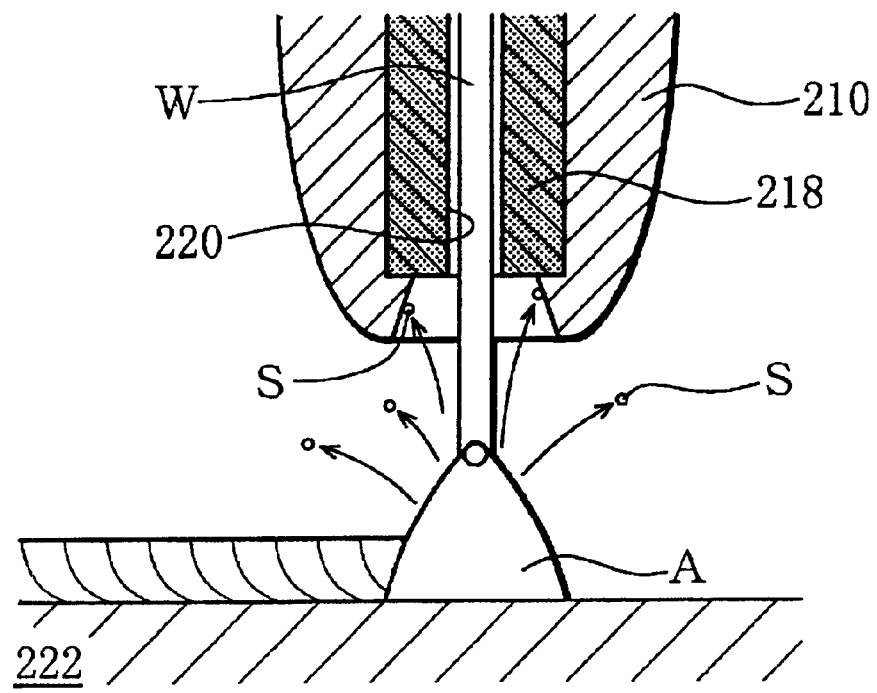
FIG. 4 is an enlarged fragmentary vertical section view for explaining problems caused in conventional arc welding.
Figure 5:
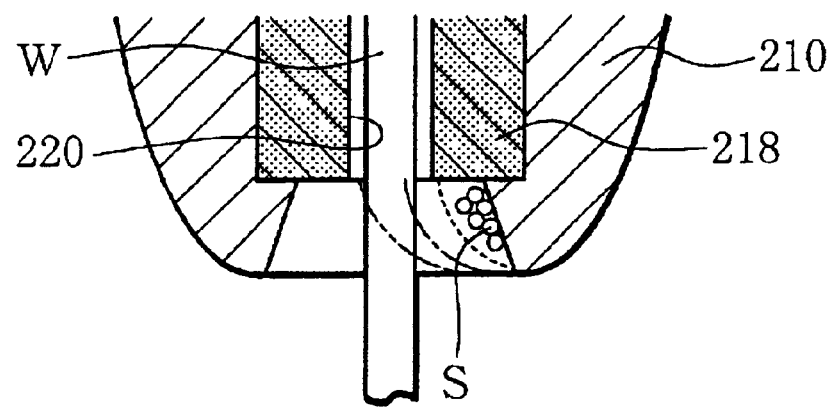
FIG. 5 is an enlarged fragmentary section view showing a distal end of the welding tip shown in FIG. 4.
Figure 6:
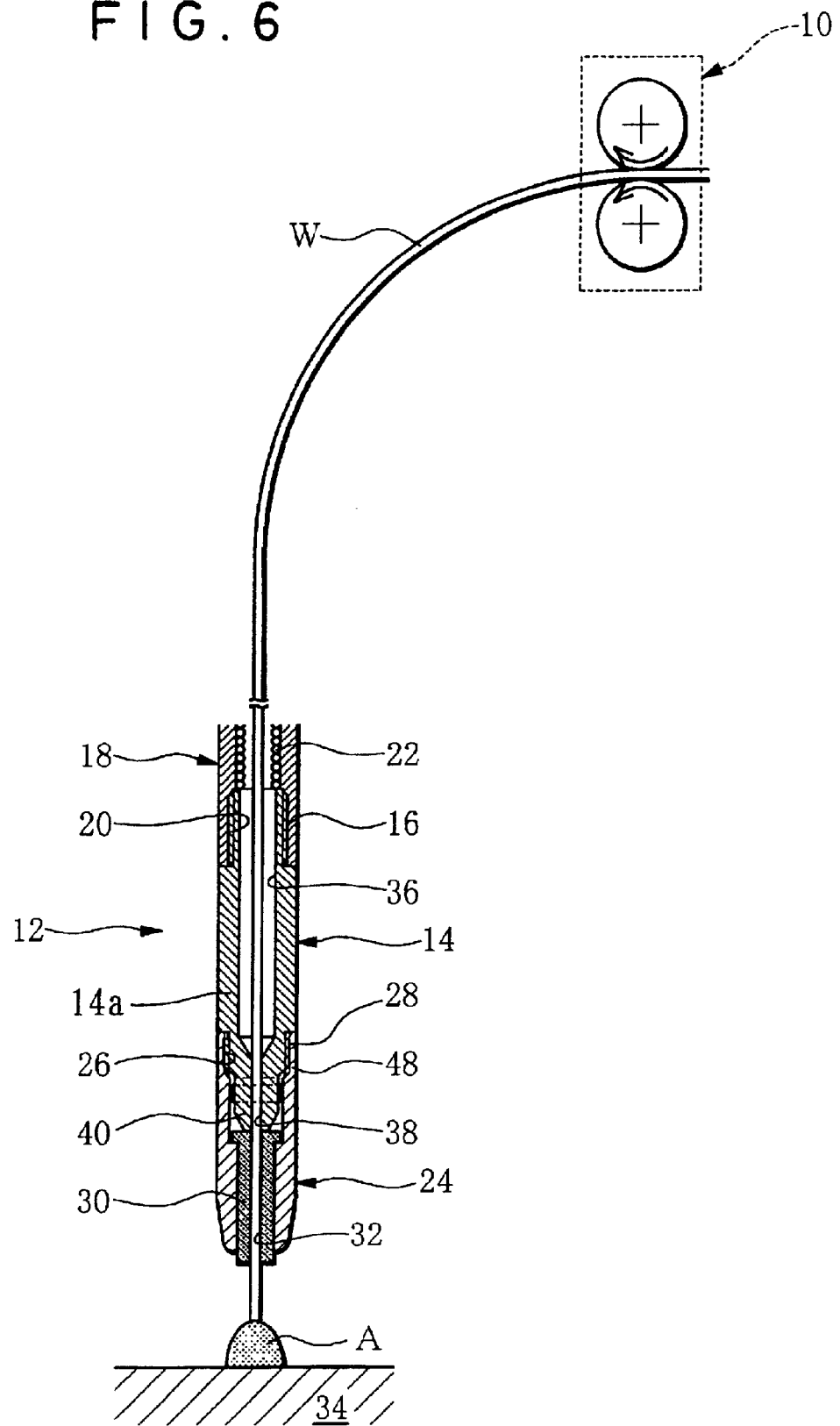
FIG. 6 is a schematic view, partly shown in vertical section, of an arc welding apparatus provided with a welding tip according to a first embodiment of the present invention.

As shown in FIG. 6, the arc welding apparatus includes a wire feed apparatus 10 for supplying a welding wire W wound in a coiled fashion, and a welding torch mounted with a welding tip 12. The welding tip 12 includes a contact 14 formed at its upper end side with a male thread portion 16 that is threadedly engaged with a female thread portion 20 formed in a lower end side of a welding torch body 18. A conduit tube 22 is inserted into the welding torch body 18.

The welding tip 12 has a tube-like metal guide 24 formed at its upper end side with a female thread portion 26 to which a male thread portion 28 formed at a lower end side of a tip body 14a of the contact 14 is threadedly engaged. An insulating guide 30 made of ceramic which is formed into a pipe is held inside the metal guide 24. The insulating guide 30 is formed with a guide hole 32 for guiding the welding wire W. Reference numeral 34 denotes a base material, and symbol A denotes an arc produced between the welding wire W and the base material 34.

Figure 7:
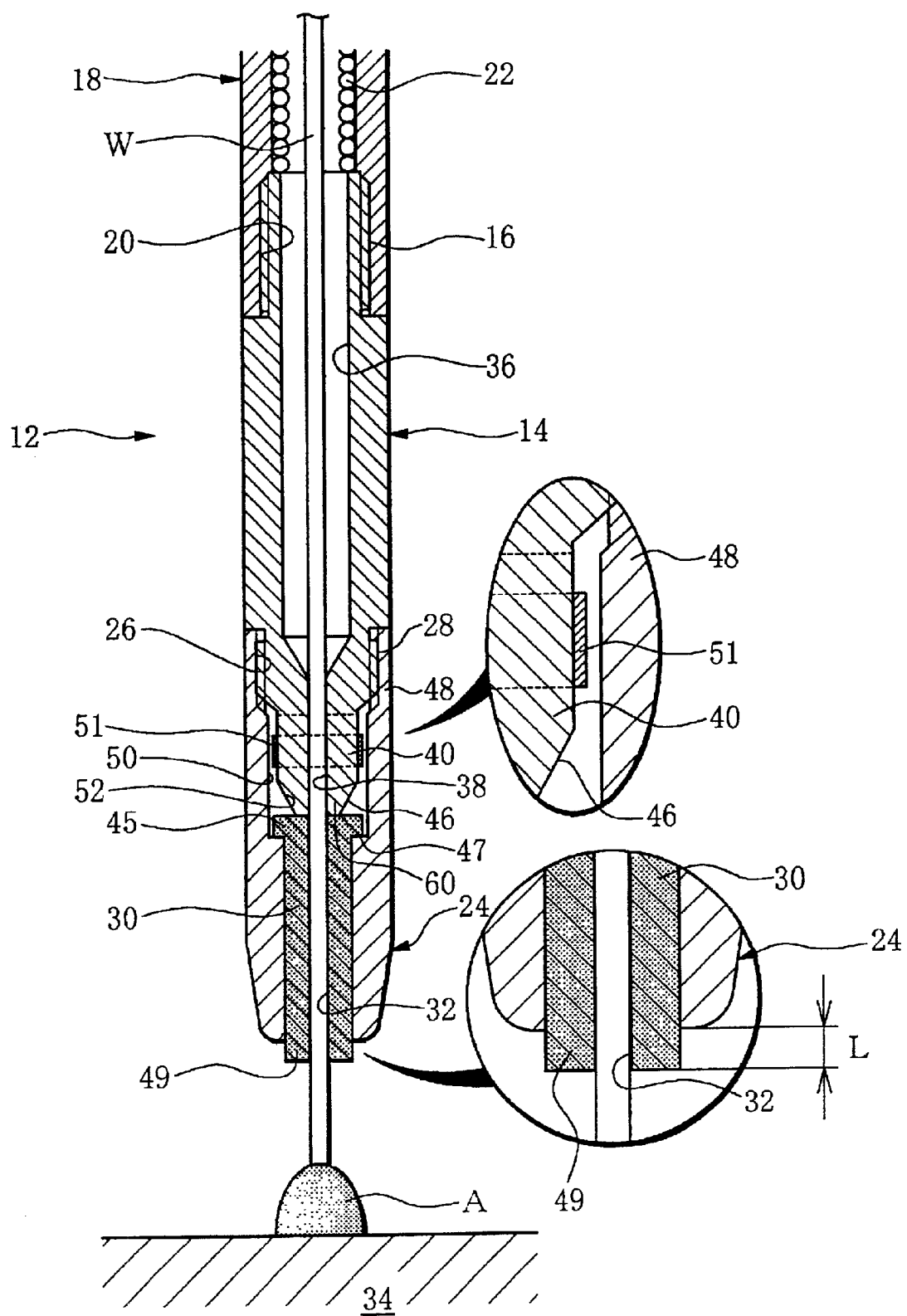
FIG. 7 is an enlarged fragmentary vertical section view of essential part of the welding tip shown in FIG. 6.
Figure 8:
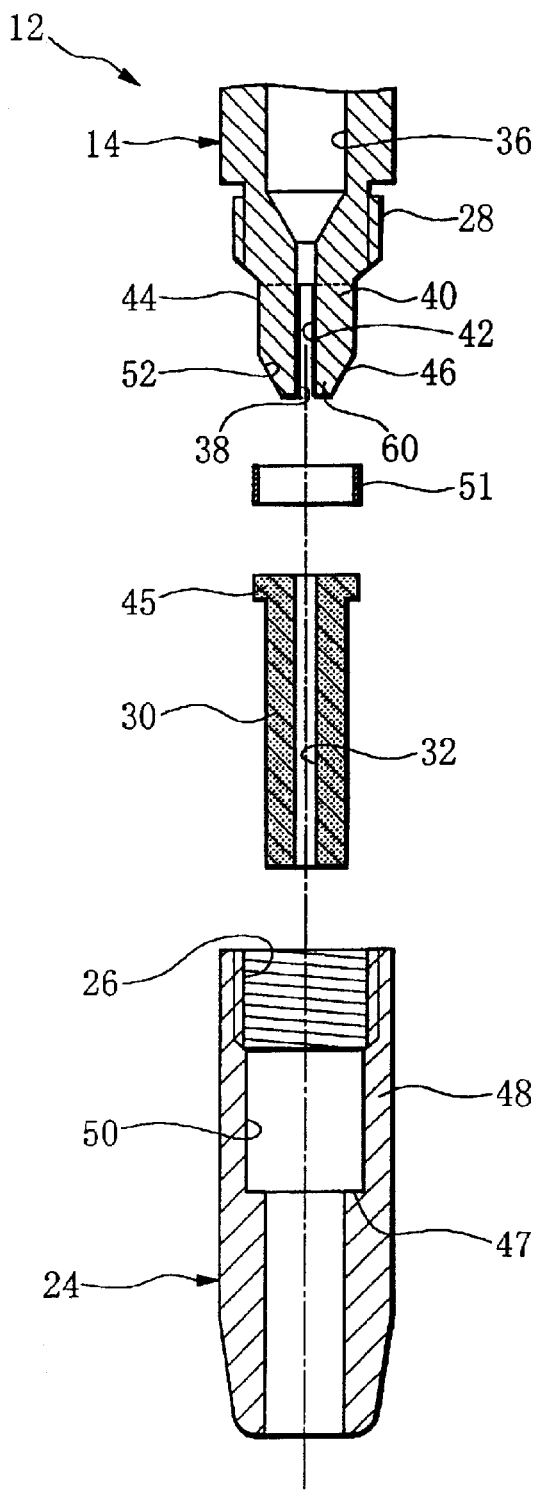
FIG. 8 is an exploded vertical section view of the welding tip shown in FIG. 6.
Figure 9:
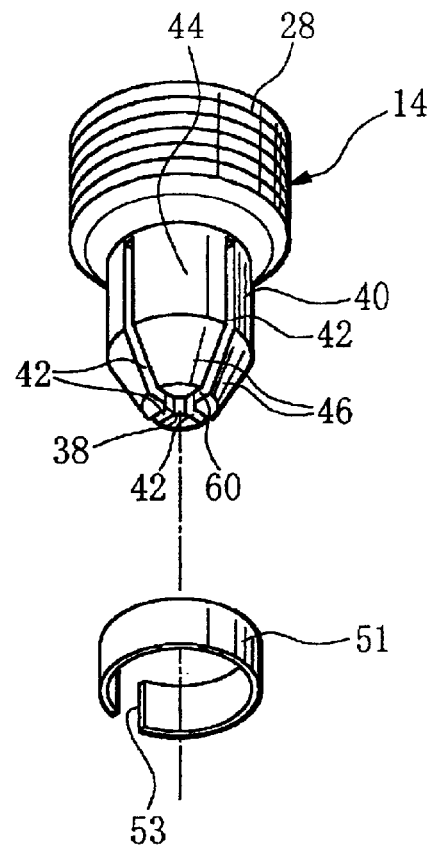
FIG. 9 is an exploded perspective view of the welding tip shown in FIG. 6.

As shown in FIG. 7, the contact 14 is formed with a wire insertion hole 36 whose lower end portion constitutes a feeder hole 38. Four vertical dividing grooves (slits) 42 are formed in the feeder portion (tip end member) 40 of the contact 14 around the feeder hole 38 so as to be circumferentially separated from one another at intervals of 90 degrees, as shown in FIGS. 8 and 9. By means of the dividing grooves 42, the feeder portion 40 is divided into four and deformability in the direction perpendicular to the axis is provided.

In the present embodiment, as shown in FIG. 7, the insulating guide 30 is formed at its upper end portion with a flange 45 which is supported by a stepped portion 47 of the metal guide 24. Specifically, the insulating guide 30 is held inside the metal guide 24, with the flange 45 sandwiched between the stepped portion 47 and the contact 14. Such an arrangement for holding the insulating guide 30 is shown by way of example, and the insulating guide 30 may be retained inside the metal guide 24 in various manners.

In the present embodiment, the distal end of the insulating guide 30 projects from the distal end of the metal guide 24 by a predetermined distance L which is preferably set within a range varying from 0.5 mm to 2.0 mm inclusive.

As shown in FIGS. 7–9, a plate spring (spring member) 51 which is obtained by forming a metal plate into a cylindrical ring shape is fitted on a right cylindrical outer periphery of the feeder portion 42 in a state that it is elastically deformed in the expanding direction. The plate spring 51 is formed into a C-shape with a gap 53. The plate spring 51 is fitted directly to the outer periphery of the feeder portion 40 having no fitting groove and serves to tighten the feeder portion 40 in a diameter-decreasing direction with a constant force.

Since the insulating guide 30 projects from the metal guide 40 in the present embodiment, spatter S disperses during the welding does not adhere to the insulating guide 30. This eliminates problems such that spatter S adhering to the inner face of the metal guide 24 grows to cause a wire supply failure and deteriorated gas shielding which promotes occurrences of pits and blow holes in a weldment. Moreover, under the action of the plate spring 51, an optimal contact force is ensured between the welding wire W and the feeder hole 38, achieving stable power supply and smooth arc welding. In addition, a large contact area or friction force is ensured between the plate spring 52 and the outer periphery of the feeder section, whereby the ring-like plate spring 51 can be positioned at a proper axial position, without the need of fitting the plate spring 51 into a circumferential groove provided in the outer periphery of the feeder section. Furthermore, with use of the plate spring 51, a sufficient tightening force acting in the diameter-decreasing direction can be applied to the feeder section 40.

Figure 10:
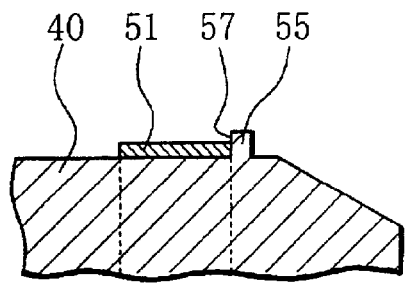
FIG. 10 is a view showing essential part of a welding tip according to a modification of the first embodiment of the present invention.

FIG. 10 shows a modification of the aforementioned first embodiment, in which a cylindrical wall 55 is formed in the feeder section 40 on the distal end side with respect to the plate spring 51 in a manner projecting therefrom to thereby form an abutment face 57 to which a distal end face of the plate spring 51 is abutted. According to this modification, the plate spring 51 is positively prevented from being detached from the feeder section 40.

Table 1 shows wires having various compositions and configurations that can be used as the welding wire in the first embodiment and its modification.

TABLE 1

| | (mass %) | | | | | | | | | |
|---|---|---|---|---|---|---|---|---|---|---|
| JIS | C | Si | Mn | P | S | Cr | Al | Ti | Nb | Mo |
| YGW11 | 0.04 | 0.77 | 1.72 | 0.011 | 0.003 | 0.05 | 0.005 | 0.18 | — | — |
| YGW12 | 0.06 | 0.80 | 1.47 | 0.010 | 0.008 | 0.05 | 0.002 | — | — | — |
| YGW14 | 0.02 | 1.16 | 1.50 | 0.014 | 0.017 | 0.03 | 0.005 | — | — | — |
| YGW15 | 0.03 | 0.64 | 1.32 | 0.013 | 0.010 | 0.04 | 0.004 | 0.06 | — | — |
| YGW16 | 0.03 | 0.63 | 1.21 | 0.017 | 0.019 | 0.03 | 0.002 | — | — | — |
| YGW17 | 0.06 | 0.39 | 1.02 | 0.006 | 0.010 | 0.06 | 0.018 | 0.03 | — | — |
| YGW18 | 0.06 | 0.68 | 1.80 | 0.005 | 0.008 | 0.05 | 0.015 | 0.02 | — | 0.26 |
| YGW19 | 0.06 | 0.74 | 1.62 | 0.011 | 0.006 | 0.05 | 0.014 | 0.23 | — | — |
| YGW21 | 0.08 | 0.65 | 2.10 | 0.013 | 0.010 | 0.02 | 0.009 | 0.16 | — | 0.40 |
| YGW22 | 0.06 | 0.67 | 1.83 | 0.009 | 0.008 | 0.04 | 0.024 | 0.02 | — | 0.27 |
| — | 0.01 | 1.04 | 0.41 | 0.013 | 0.004 | 18.7 | 0.004 | — | 0.12 | |
| — | 0.15 | 0.75 | 2.11 | 0.018 | 0.015 | 0.02 | 0.055 | — | — | Deposited Metal |

With reference to FIGS. 11–14, a welding tip according to a second embodiment of this invention for a consumable electrode type gas shielded arc welding will be explained.

Figure 11:
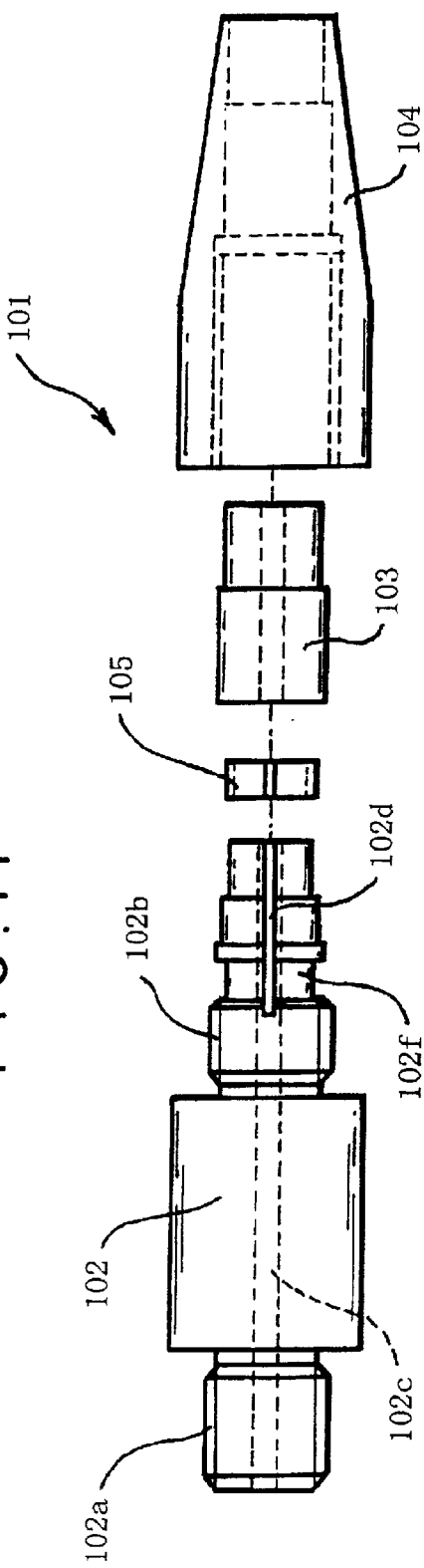
FIG. 11 is an exploded view of a welding tip according to a second embodiment of the present invention for a consumable electrode type gas shielded arc welding.
Figure 12:
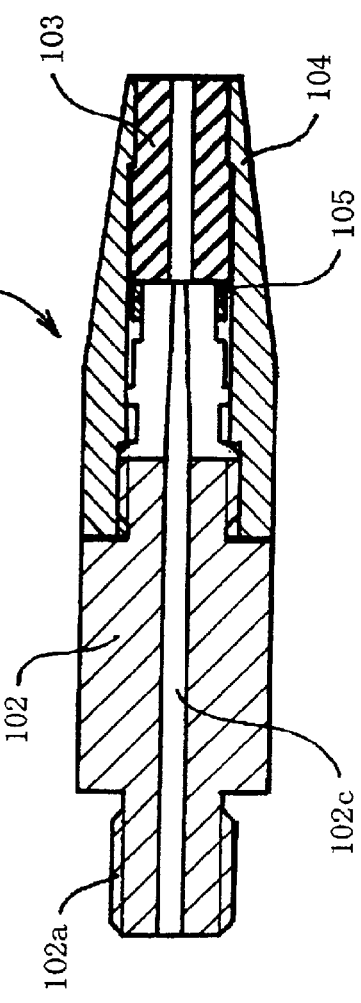
FIG. 12 is a section view of the welding tip shown in FIG. 11.

The welding tip 101 shown in FIGS. 11 and 12 is mainly comprised of a contact 102 made of a cupper-based alloy, an insulating guide 103 made of ceramic such as silicon carbide, and a hollow guide holder (metal guide) 104 made of appropriate metal for holding the insulating guide 103 at a distal end of the contact 102. The contact 102 has a male thread portion 102a thereof formed on the left end as viewed in FIGS. 11 and 12 at which portion the contact is detachably mounted to a distal end of a welding torch body (not shown), and has a male thread portion 102b thereof on the right side in FIGS. 11 and 12 to which portion the guide holder 104 that receives the insulating guide 103 is detachably mounted.

The contact 102 is formed with a wire insertion hole 102c which permits a welding wire to pass therethrough, and is subject to crosswise slit-groove machining to have four slit grooves 102d at its right-side distal end (tip end member), as shown at greater magnification in FIGS. 13 and 14. Where required, after the slit machining, the tip end member of the contact 102 may be subject to forging to thereby narrow the slit width at the extreme end of the slit groove 102d (see, FIG. 13). A plate spring serving as a spring member and formed into a C-shape is fitted on the distal end of the contact 102 to produce an elastic force urging the welding wire, so as to apply withdrawal resistance F thereto. To make the distal end of the contact 102 flexible, each slit groove 102d is deeply formed in the axial direction and a small-diameter portion 102f serving as a recess is formed at the proximal end of the slit groove 102d.

In the welding tip 101 having the contact 102 not subject to forging to narrow the slit end width, an adjustment of the wire withdrawal resistance F to fall within a range from 100 D to 2,000 D (g), where D(mm) represents the welding wire diameter, makes it possible to attain a satisfactory power supply state, i.e., a satisfactory electric contact between the contact 102 and the welding wire, whereby a stable arc can be attained for a long time.

Furthermore, the distal end of the contact 102 is urged by means of the plate spring 105 to make the slit end width equal to or less than 0.3 D (mm) and the contact 102 and the insulating guide 103 are close to or in contact with each other so as not to permit welding fume to enter by adjusting a clearance G (see FIG. 13) therebetween to be equal to or less than 0.1 D (mm), whereby welding fume is prevented from being accumulated in the slit grooves 102d and the distal end of the contact 102 is freely deformed by the action of the plate spring 105. As a result, the contact 102 can produce an urging force for a long time that acts on the welding wire, thus maintaining a stable arc for a long time.

FIGS. 15 and 16 show a modification of the contact 102 in the welding tip 101 according to the second embodiment of this invention. The wire insertion hole 102 formed in the contact 102 to extend along its axis is formed into a stepped configuration that is comprised of a small diameter portion 102g whose inner diameter is substantially equal to the welding wire diameter and a large diameter portion 102h having an inner diameter thereof larger than the inner diameter of the small diameter portion.

The small diameter portion 102g is located on the distal end side (i.e., the insulating-guide side) of the contact and is formed with the slit grooves 102d, whereas the large diameter portion 102h is formed on the left side in FIG. 15, i.e., the wire supply side. The large diameter portion 102h extends to the proximal end of the slit groove 102d and opens to the slit groove 102d. The stepped configuration of the wire insertion hole 102c of the contact 102 permits foreign matter, such as plated-layer chippings entering the wire insertion hole together with the welding wire, to be easily discharged, so as not to enter into the distal end of the contact 102 serving as the feeding section, whereby a wire supply failure can be prevented and a stable welding state can be maintained.

The welding tip 101 having the above construction can be built into an ordinary arc welding apparatus, e.g., a consumable electrode type gas shielded arc welding apparatus, thus increasing the wire extension length to improve the welding efficiency. In addition, welding current supply can be stabilized to permit stable welding for a long time, with the frequency of welding tip replacement greatly reduced.

Application of the welding tip 101 to arc welding, e.g., consumable electrode type gas shielded arc welding makes it possible to suppress the run-out or concentricity offset of the welding wire at its distal end, which wire is continuously supplied from the welding tip 101, within a range equal to or less than 0.5 D (mm) per 10 mm wire extension length measured from the contact 102, where D indicates the welding wire diameter, whereby a dislocated welding position and a snaking weld bead can be prevented, thus greatly improving the appearance and dimensional accuracy of a weldment.

EXAMPLE 1

In the fabrication of a welding tip 101 shown in FIGS. 11 and 12 for consumable electrode type gas shielded arc welding, a reference hole having 1.30 mm inner diameter for a wire insertion hole 102c was formed in the contact 102, and then the contact was subject to crosswise slit-machining, whereby four slit grooves 102d were formed at the distal end of the contact to the depth of 12 mm so as to be circumferentially spaced from one another. Plate springs 105 having different strengths were mounted to contacts 102, thereby fabricating contacts having different wire withdrawal resistances F. At this time, the wire withdrawal resistance was measured by using a spring scale as a welding wire was caused to pass the contact.

Each of the resultant contacts 102 was built into a pulsed MAG welding apparatus, not shown, together with the insulating guide 103 and the guide holder 104 in a manner that the contact 102 was in contact with the insulating guide 103. Then, a durability welding test was performed by repeating the below-mentioned welding cycle with use of a welding wire of 1.2 mm diameter corresponding to JIS YGW15, to determine the durability of each welding tip, more specifically, the relationship between the number of times of welding cycle and variation in welding current. Each welding cycle consisted of 2-minute bead-on welding on a water-cooled drum and 30-second rest, and welding conditions were welding current of 250 A, welding voltage of 31 V, welding speed of 80 cm/min, and shield gas of Ar-20% $CO_2$. The insulating guide 103 of 10 mm length was used, and the welding wire was projected from the contact 102 to have the wire extension length of 25 mm.

Figure 17:
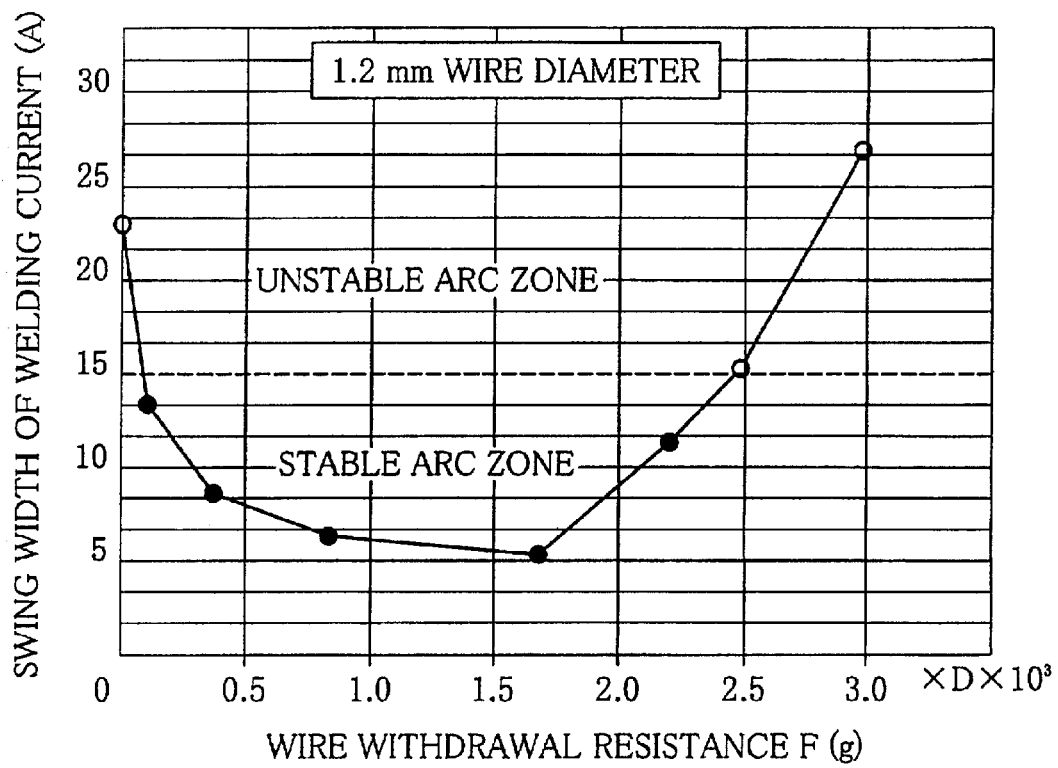
FIG. 17 is a graph showing influence of wire withdrawal resistance on the durability of a contact for a welding wire of 1.2 mm diameter.

FIG. 17 shows the swing amplitude or deflection of welding current as a function of the product of wire withdrawal resistance F (g) and welding wire diameter D (mm), the deflection being observed for each contact after completion of 300 welding cycles.

Figure 18:
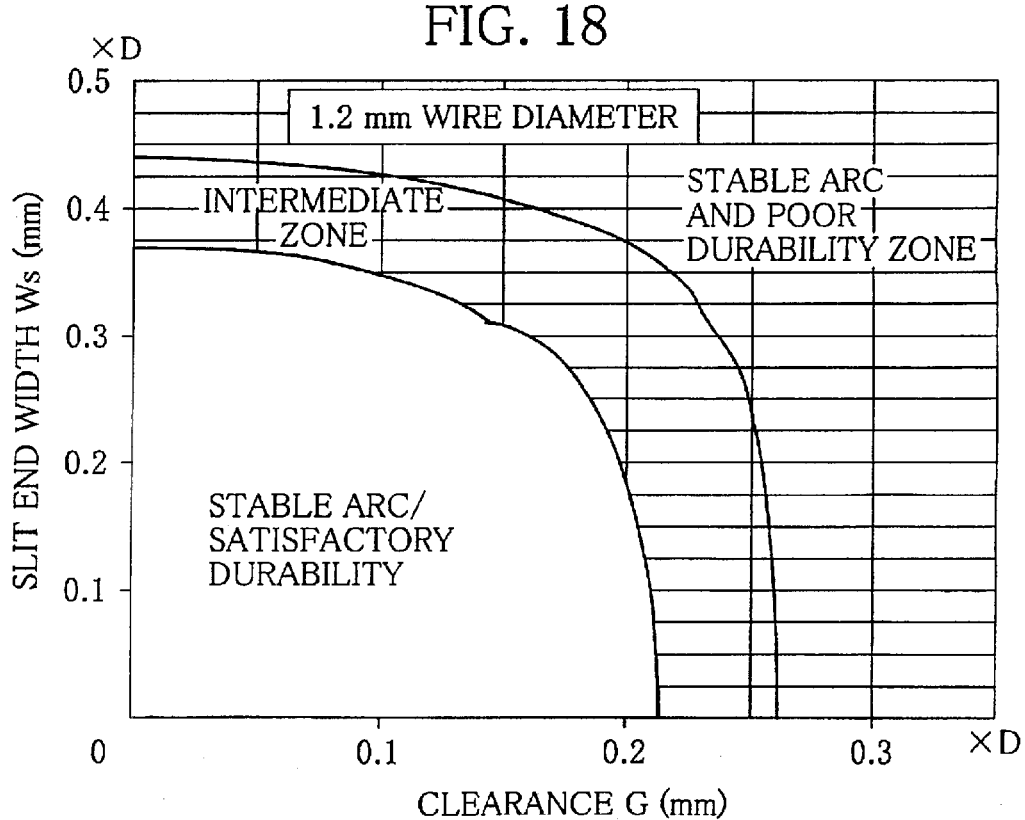
FIG. 18 is a graph showing a suitable range of slit width Ws at a distal end of a contact and a suitable range of a clearance G between a contact and an insulating guide for a welding wire having 1.2 mm diameter, these ranges providing the contact with satisfactory durability.
Figure 19:
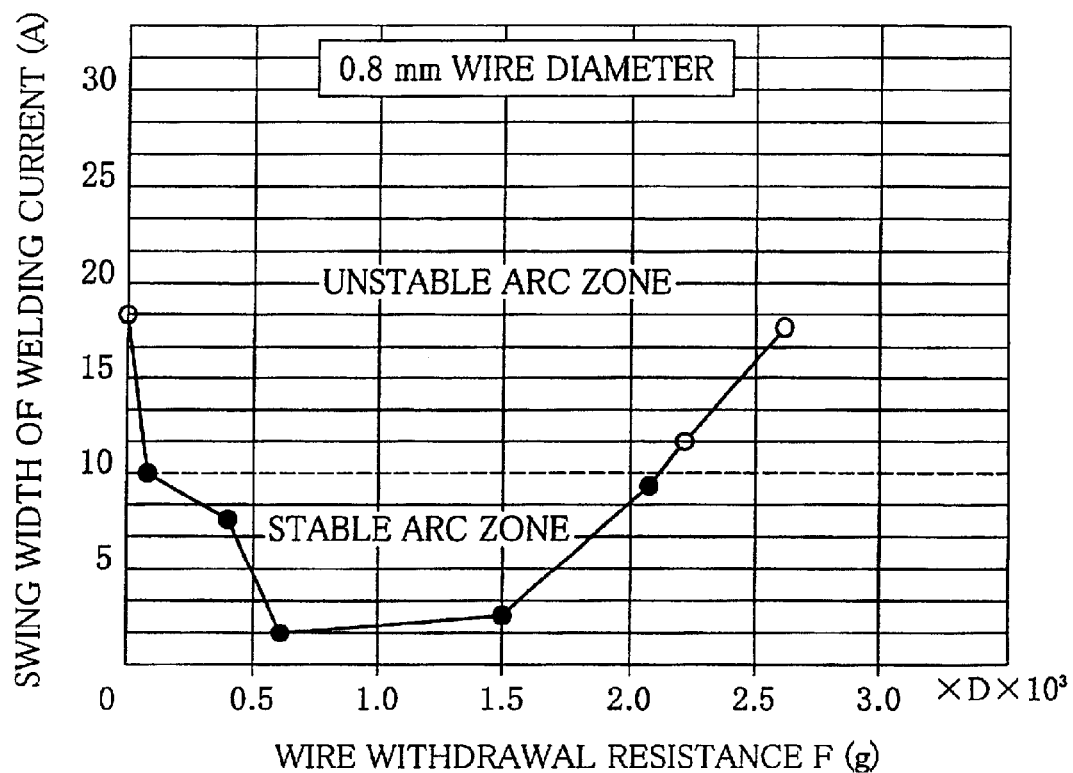
FIG. 19 is a graph showing influence of wire withdrawal resistance on the durability of a contact for a welding wire having 0.8 mm diameter.
Figure 20:
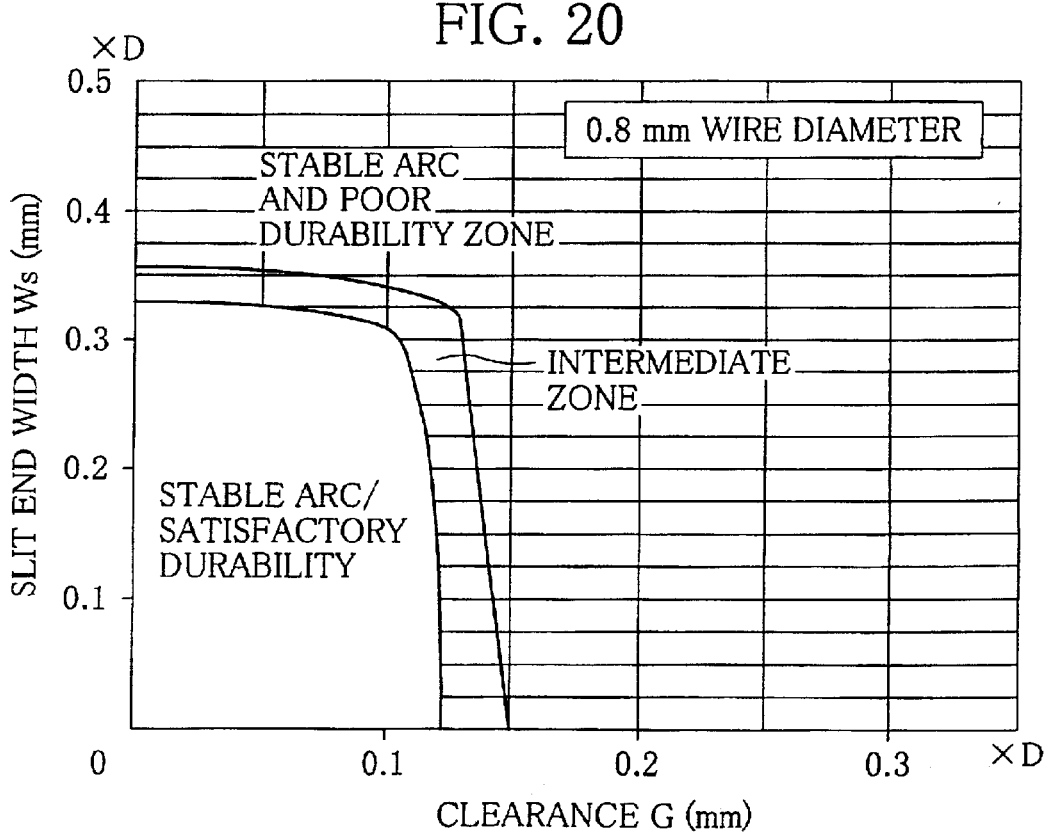
FIG. 20 is a graph for showing a suitable range of a slit end width Ws and a suitable range of a clearance G between a contact and an insulating guide for a welding wire having 0.8 mm diameter.
Figure 21:
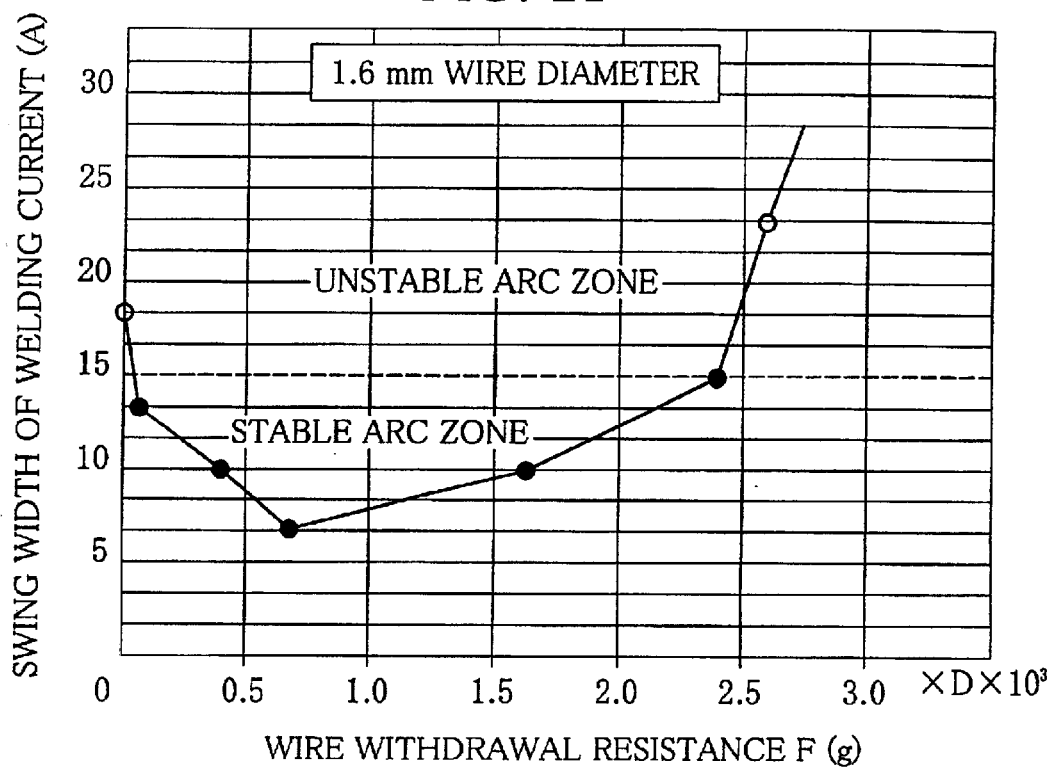
FIG. 21 is a graph showing influence of wire withdrawal resistance on the durability of a contact for a welding wire of 1.6 mm diameter.
Figure 22:
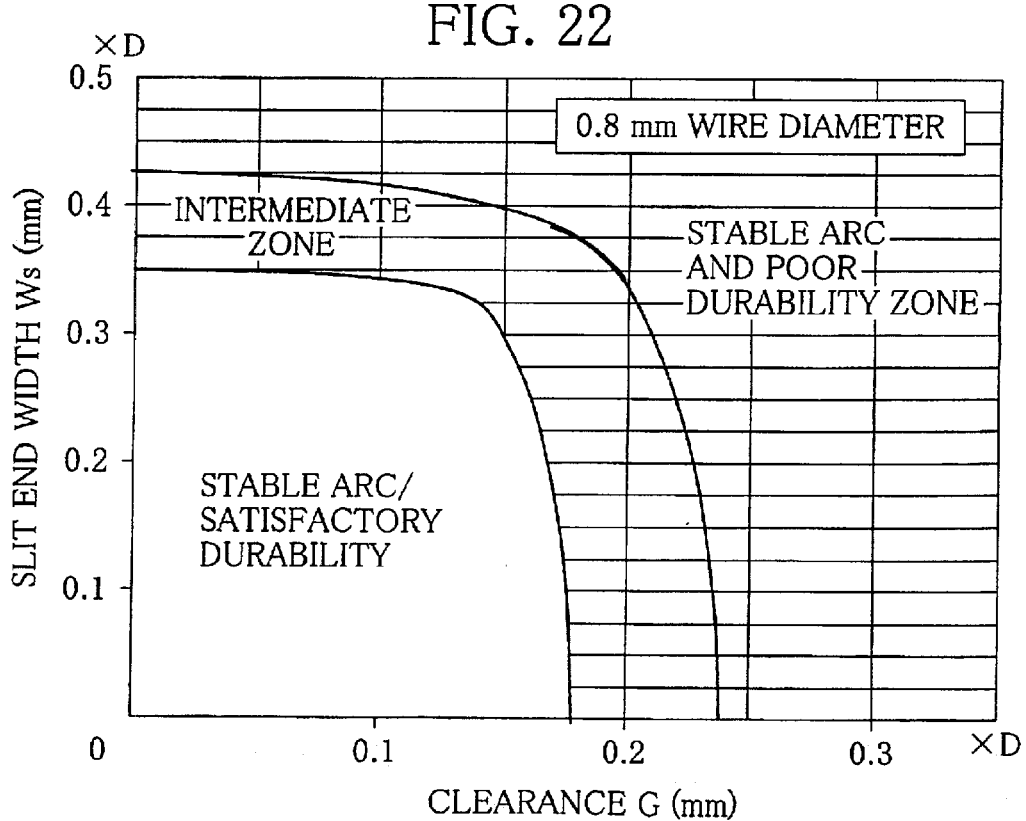
FIG. 22 is a graph showing a suitable range of slit end width Ws and a suitable range of clearance G between a contact and insulating guide for a welding wire of 1.6 mm diameter.

A durability welding test similar to the above was conducted, with a clearance G (see FIG. 13) between the insulating guide 103 and the contact 102, which were similar to the aforesaid ones, being varied, and suitable ranges of slit groove width and clearance G (mm) were determined, in which ranges the deflection of welding current after 300 welding cycles was equal to or less than 15 amperes and a stable welding was ensured for a long time. Results are shown in FIG. 18 in which the product of slit groove width Ws (mm) and wire diameter D (mm) is shown as a function of the product of clearance G (mm) and wire diameter D (mm).

Similar durability welding tests were made in respect of wire diameters of 0.8 mm and 1.6 mm, and test results are shown in FIGS. 19–22. For the case of 0.8 mm wire diameter, the diameter of reference hole for the wire insertion hole 102c of each contact 102 was set to 0.8 mm, and welding conditions of 110 A welding current, 18.5 V welding voltage, and 80 cm/min welding speed were used, with the insulating guide of 10 mm length and the wire extension length of 22 mm being used. Arc stability was evaluated as being satisfactory when the deflection of welding current was equal to or less than 10 amperes. For the case of 1.6 mm wire diameter, the reference hole diameter for the wire insertion hole 102c was set to 1.70 mm, with welding current of 280 A, voltage of 33 V and welding speed of 80 cm/min being set as welding conditions and the insulating guide 103 of 20 mm length and the wire extension length of 38 mm being used. As the criteria for determining satisfactory arc welding, the welding current deflection of 15 A was used, as in the case of 1.2 mm wire diameter.

As apparent from FIGS. 17–22, even if the contact point (feeding section) between the contact 102 and the welding wire is worn out, a satisfactory contact state is maintained therebetween by an elastic force produced by the plate spring 105. Accordingly, it is confirmed that the swing width or deflection of welding current can be made small and stabilized irrespective of the welding wire diameter by adjusting the wire withdrawal resistance F to be within a range from 100 D (g) to 2,000 D (g), whereby stable welding can be carried out for a long time. Further, it is found that an increased slit end width Ws of the contact 102 produces friction between the welding wire and the slit groove 102d, thereby hindering the smoothness in wire supply and decreasing the contact area between the welding wire and the contact to deteriorate the power supply durability. Moreover, the increase in the clearance G between the contact 102 and the insulating guide 103 permits the intrusion of welding fume from arc side, making it difficult to attain a pressing force acting on the welding wire and to maintain a stable arc for a long time. In short, it is confirmed that a welding tip having satisfactory durability can be attained by setting the slit groove width Ws and the clearance G to fulfill the requirements that Ws≦0.3 D (mm) and G≦0.1 D (mm).

According to a similar test performed in respect of welding tips having no plate spring 105, suitable ranges for wire withdrawal resistance F, slit groove width Ws and clearance G are as follows: 500 D≦F≦2500 D, Ws≦0.2 D and G≦0.2 D.

EXAMPLE 2

With use of the welding tip of this invention, drum-welding durability tests similar to Example 1 were performed in respect of welding wires having 0.8 mm, 1.2 mm and 1.6 mm diameters, respectively. The run-out or concentricity offset of the welding wire before start of welding, after 100 welding cycles and after 300 welding cycles were measured on the welding tip of this invention and a conventional welding tip each having no insulating guide. As for evaluation of the run-out of the welding wire, the wire extension length was intentionally lengthened up to 150 mm, and a target test or fixed-point punching test was conducted in which the welding wire was delivered toward a graph paper to form a hole therein. A measured value was divided by 15 to be converted into the run-out per wire extension length of 10 mm. The run-out equal to or less than one half of the wire diameter D (i.e., equal to or less than 0.4 mm, 0.6 mm and 0.8 mm for wire diameters of 0.8 mm, 1.2 mm and 1.6 mm, respectively) was accepted (◯) and the run-out larger than that was rejected (X).

For the just-mentioned tests for 0.8 mm, 1.2 mm and 1.6 mm wire diameters, welding tips individually having slit groove widths Ws of 0.10 mm, 0.20 mm and 0.30 mm and wire withdrawal resistances of 1,000 g, 1,500 g and 2,000 g were used, with the clearance G between the contact and the insulating guide being set to 0 mm (close contact). The lengths of the insulating guide were set to 10 mm for 0.8 mm and 1.2 mm wire diameters and to 20 mm for 1.6 mm diameter, as in the case of Example 1. Table 2 shows results of the run-out measurement.

TABLE 2

| WIRE DIAMETER (mm) | WELDING TIP OF THIS INVENTION | | | | CONVENTIONAL WELDING TIP | | | |
|---|---|---|---|---|---|---|---|---|
| | PRIOR TO WELDING | | AFTER 100 WELDING CYCLES | | PRIOR TO WELDING | | AFTER 100 WELDING CYCLES | |
| | RUN-OUT (mm) | EVALUATION | RUN-OUT (mm) | EVALUATION | RUN-OUT (mm) | EVALUATION | RUN-OUT (mm) | EVALUATION |
| 0.8 | 0.24–0.29 | ◯ | 0.29–0.35 | ◯ | 0.26–0.28 | ◯ | 0.50–0.56 | X |
| 1.2 | 0.47–0.50 | ◯ | 0.49–0.55 | ◯ | 0.50–0.58 | ◯ | 0.75–0.85 | X |
| 1.6 | 0.65–0.69 | ◯ | 0.73–0.77 | ◯ | 0.60–0.65 | ◯ | 1.10–1.15 | X |

As apparent from the experimental results shown in Table 2, the run-out of the welding wire after 100 welding cycles exceeded the value of 0.5 D for acceptance/rejection evaluation in comparative examples in which the conventional welding tip was used, whereas the run-out of the welding wire hardly changed irrespective whether or not the plate spring was mounted, when the welding tip of this invention was used in which the insulating guide was hardly worn out.

In the following, an arc welding apparatus will be explained that is provided with a welding torch having a welding tip according to a third embodiment of this invention.

Figure 23:
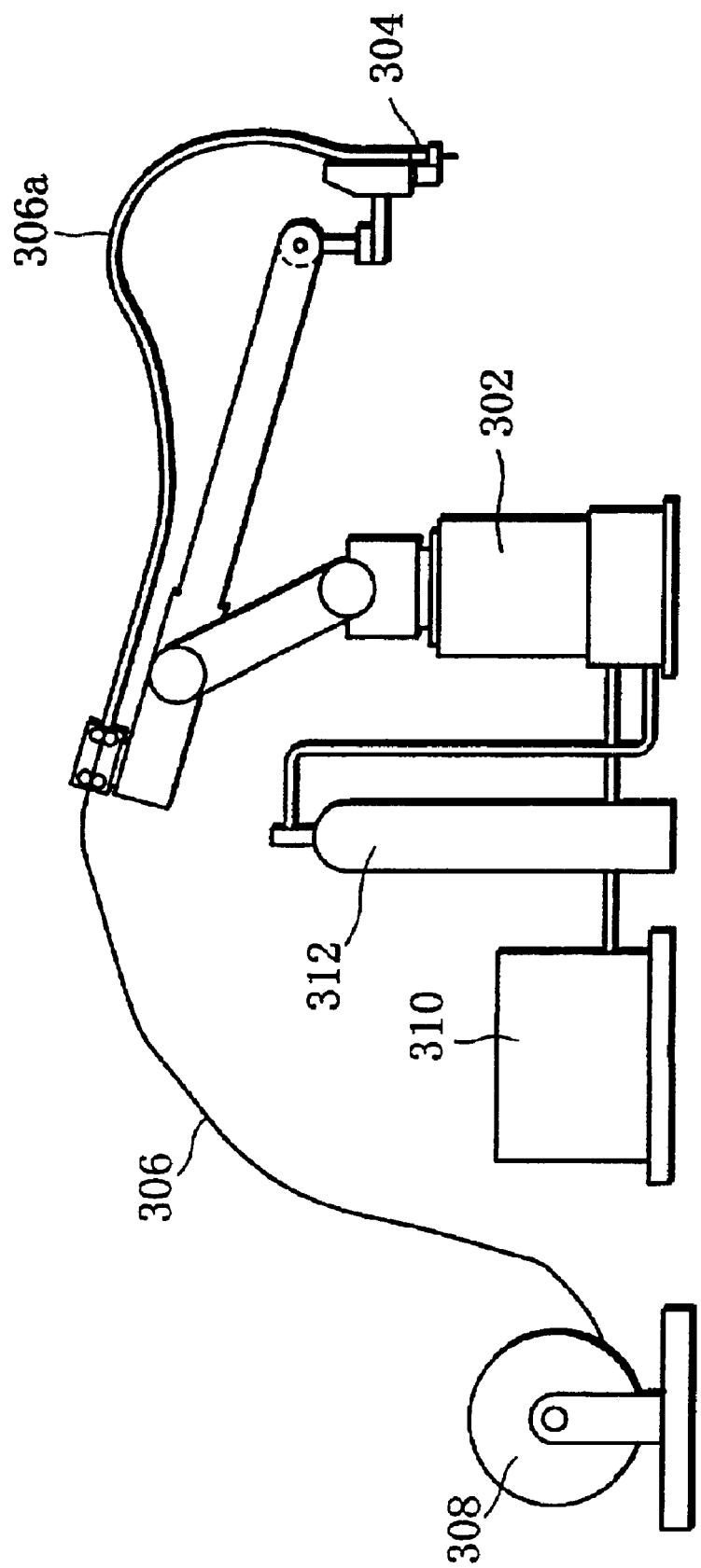
FIG. 23 is a schematic side view of an arc welding apparatus according to a third embodiment of the present invention.

As shown in FIG. 23, the arc welding apparatus of this embodiment is constituted by way of example in the form of a gas shielded type welding robot which comprises a welding torch 304 mounted to a robot hand of a robot body 302, a wire supply apparatus 308 for supplying a welding wire 306 to the welding torch 304, a welding power source 310 for supplying electric power to the welding torch 304, and a gas supplying apparatus 312 for supplying shield gas to the welding torch 304. In FIG. 23, reference numeral 306a denotes a conduit tube. Meanwhile, the welding robot is not limited to the illustrated one in construction.

Figure 24:
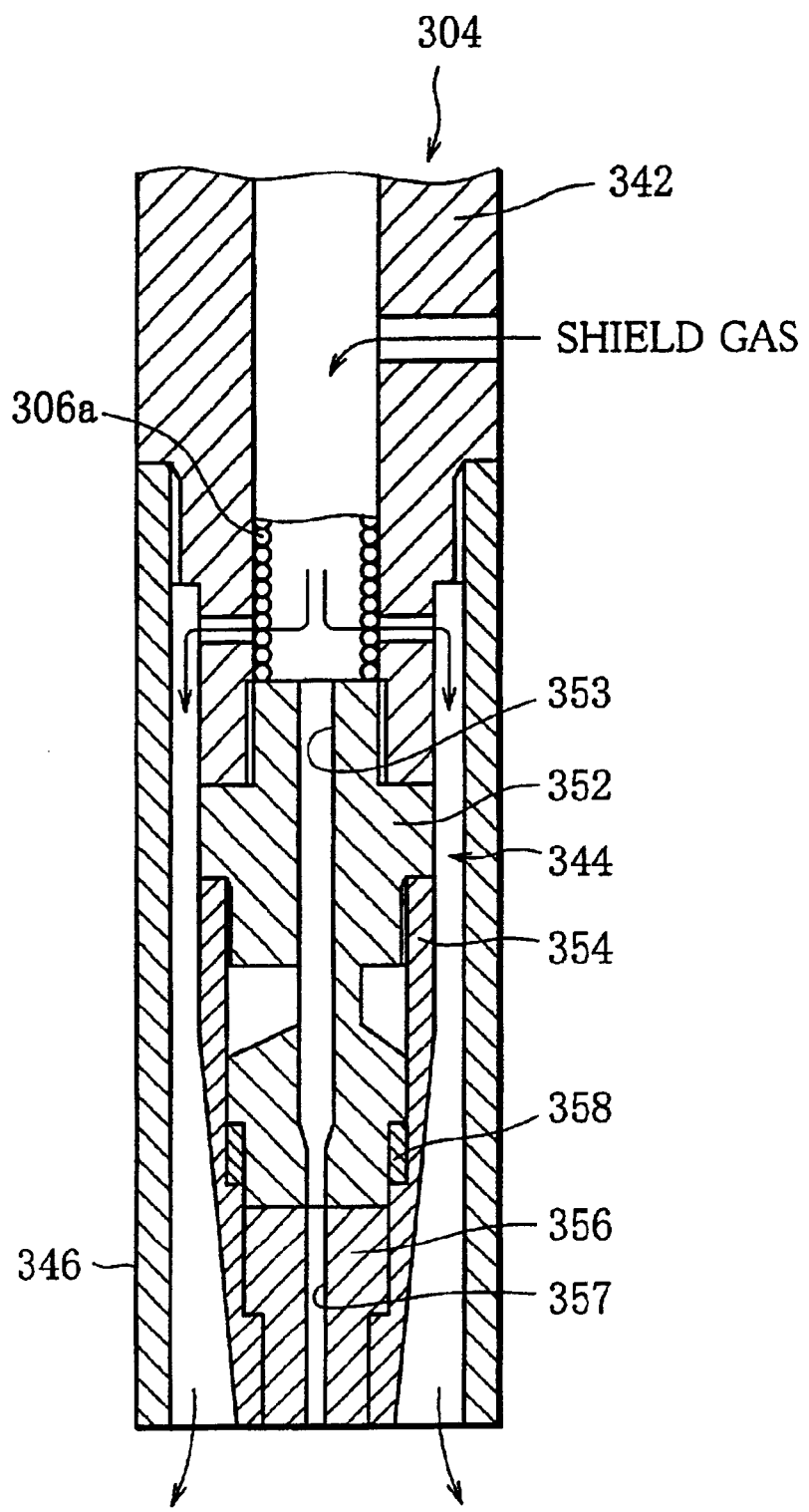
FIG. 24 is an enlarged fragmentary section view showing a torch body of a welding torch, a welding tip and a nozzle which are provided in the arc welding apparatus shown in FIG. 23.

As shown in FIG. 24, the welding torch 304 comprises a welding torch body 342, a welding tip 344 mounted thereto, and a nozzle 346 mounted to the welding torch body 342, and is arranged to supply the shield gas from the gas supplying apparatus 312 into a passage defined between the welding tip 344 and the nozzle 346.

The welding tip 344 comprises a contact 352 mounted to the hollow welding torch body 342, a hollow metal guide 354 mounted to a distal end of the contact 352, an insulating guide 356 accommodated in the metal guide 354, and a spring member 358 fitted on the contact 352. In FIG. 24, reference numeral 357 denotes a wire guide hole.

Figure 25:
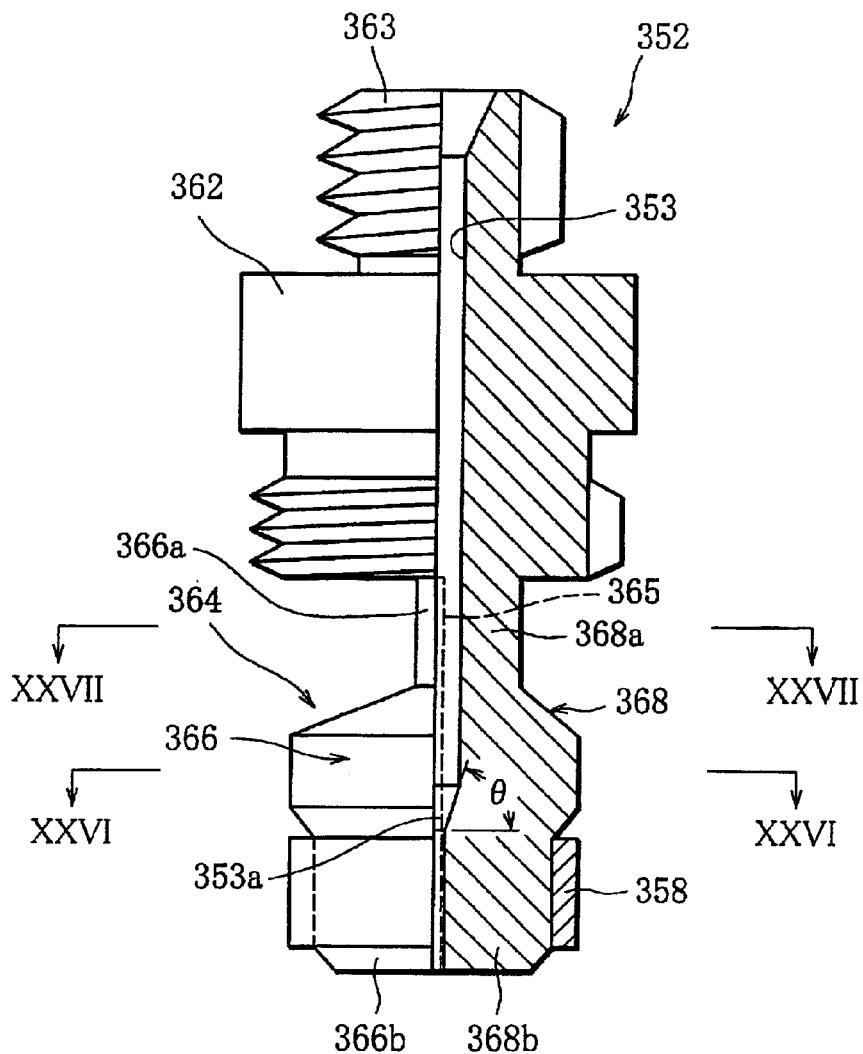
FIG. 25 is an enlarged view showing in cross section a right half of a contact provided in the welding tip shown in FIG. 24.
Figure 26:
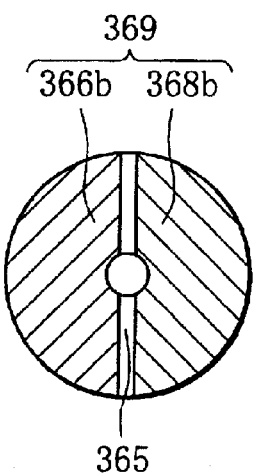
FIG. 26 is a section view taken along XXVI—XXVI line in FIG. 25.

As shown in FIG. 25, the contact 352 is constituted by a tip body 362, a thread portion 363 and a tip end member 364 that are formed integrally with the tip body 362. The tip end member 364 is divided into two parts, i.e., a first half (first part) 366 and a second half (second part) 368, by means of a slit 365 formed therein and extending along its axis over the entire length thereof. Meanwhile, the tip end member 364 may be divided into three parts or more.

The thread portion 363 of the contact 352 has an outer periphery thereof formed with a male thread which threadedly engages with a female thread formed in an inner periphery of the torch body 342, so that the contact 353 may be threadedly engaged with the torch body 342 as shown in FIG. 24.

The contact 352 is formed with a wire insertion hole 353 extending along the axis thereof and communicating with the slit 365 formed in the tip end member 364. Preferably, an upstream portion of the wire insertion hole 353 has a first hole diameter which is larger than the diameter of the welding wire 306 (FIG. 23), whereas a downstream portion thereof has a second hole diameter smaller than the wire diameter. The wire insertion hole of large diameter extends from the distal end of the thread portion 363 of the contact 352 to an intermediate portion of the tip end member 364, and communicates with the wire insertion hole of small diameter via a taper portion 353a whose hole diameter gradually decreases from the first hole diameter to the second hole diameter. A taper angle θ of the taper portion 353a is preferably equal to or less than 45 degrees.

As shown in FIG. 25, the first half 366 of the tip end member 364 of the contact 352 is constituted by a flat plate portion 366a integral with the tip body 362, and a stepped semi-cylindrical portion 366b integral with the flat plate portion 366a. On the other hand, the second half 368 of the tip end member 364 is constituted by a semi-cylindrical portion 368a of a small diameter that is integral with the tip body 362, and a stepped semi-cylindrical portion 368b integral therewith. The stepped semi-cylindrical portions 366b, 368b of the first and second halves 366, 368 constitute as a whole a stepped cylindrical portion 369 whose small-diameter distal end portion has its outer periphery on which the spring member 358 is mounted. The spring member 358 of the present embodiment is fabricated by forming a flat spring plate such as a stainless plate into a C-shape ring as viewed in plan, and is adapted to produce a spring force with which the spring member is fitted on the outer periphery of the cylindrical portion 369. This eliminates the need of using the cylindrical portion having the outer periphery thereof formed with a circumferential groove for receiving the spring member.

Figure 27:
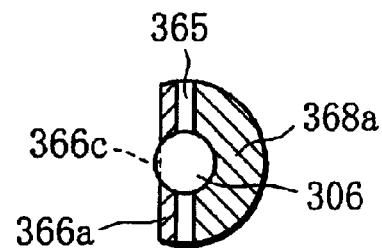
FIG. 27 is a section view taken along XXVII—XXVII line in FIG. 25.

As shown in FIGS. 25 and 27, the flat plate portion 366a of the first half 366 of the tip end member 364 has a thickness which is less than half of a value obtained by subtracting the slit width from the diameter of the large-diameter portion of the wire insertion hole 353, so that the welding wire 306 is exposed while passing through the wire insertion hole 353. In other words, the flat plate portion 366a is formed with a discharge hole 366c. To be noted, since the wire insertion hole 353 is large in diameter on the upstream side of the taper portion 353a, the discharge hole 366c can be formed, without the need of excessively decreasing the thickness of the flat plate portion 366a of the first half 366. In this manner, the thickness of the flat plate portion 366a of the first half 366 is appropriately thinned in this embodiment, so as to provide the first half 366 with predetermined rigidity that falls within a range, e.g., from 3.92 N to 39.2 N inclusive. The rigidity can be measured by using a digital force gauge manufactured by NIDEC-SHIMPO Corporation, for instance.

Figure 28:
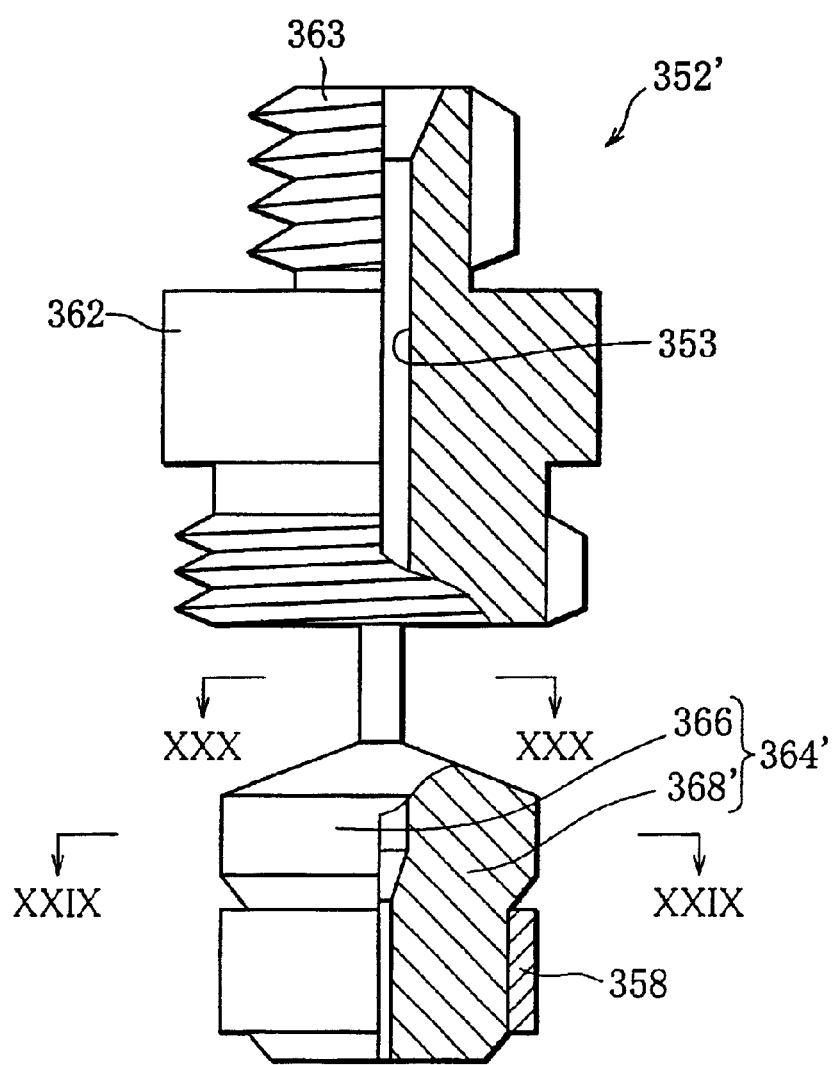
FIG. 28 is a view, similar to FIG. 25, showing a contact provided in a welding tip according to a modification of the third embodiment of the present invention.
Figure 29:
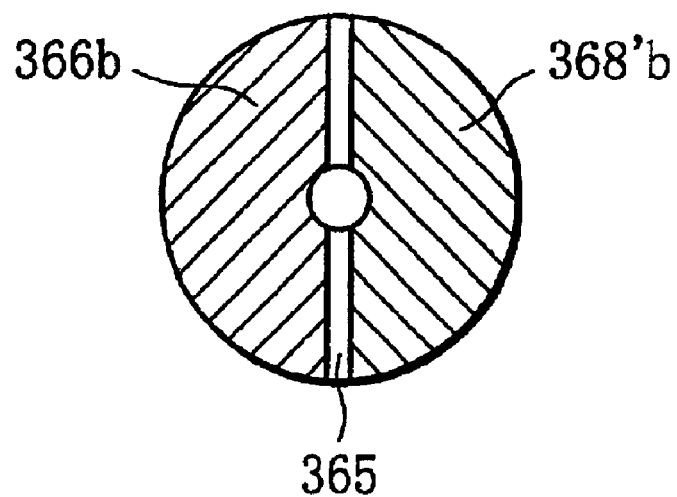
FIG. 29 is a section view taken along XXIX—XXIX line in FIG. 28.
Figure 30:
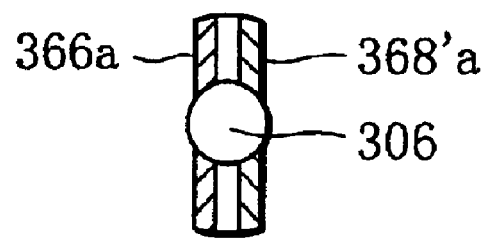
FIG. 30 is a section view taken along XXX—XXX line in FIG. 28.

FIGS. 28–30 show a modification of the welding tip according to the third embodiment of this invention.

The welding tip according to this modification is common to that of the third embodiment in that the tip end member 364 of its contact 352' is divided into two parts, i.e., the first half 366 and the second half 368' by means of slit formation, but differs therefrom in that the second half 368' is constituted by a flat plate portion 368'a and a semi-cylindrical portion 368'b and provided with the aforesaid predetermined rigidity.

The present inventors conducted various tests, mentioned later, in creating the welding tip having the aforementioned construction.

Figure 31:
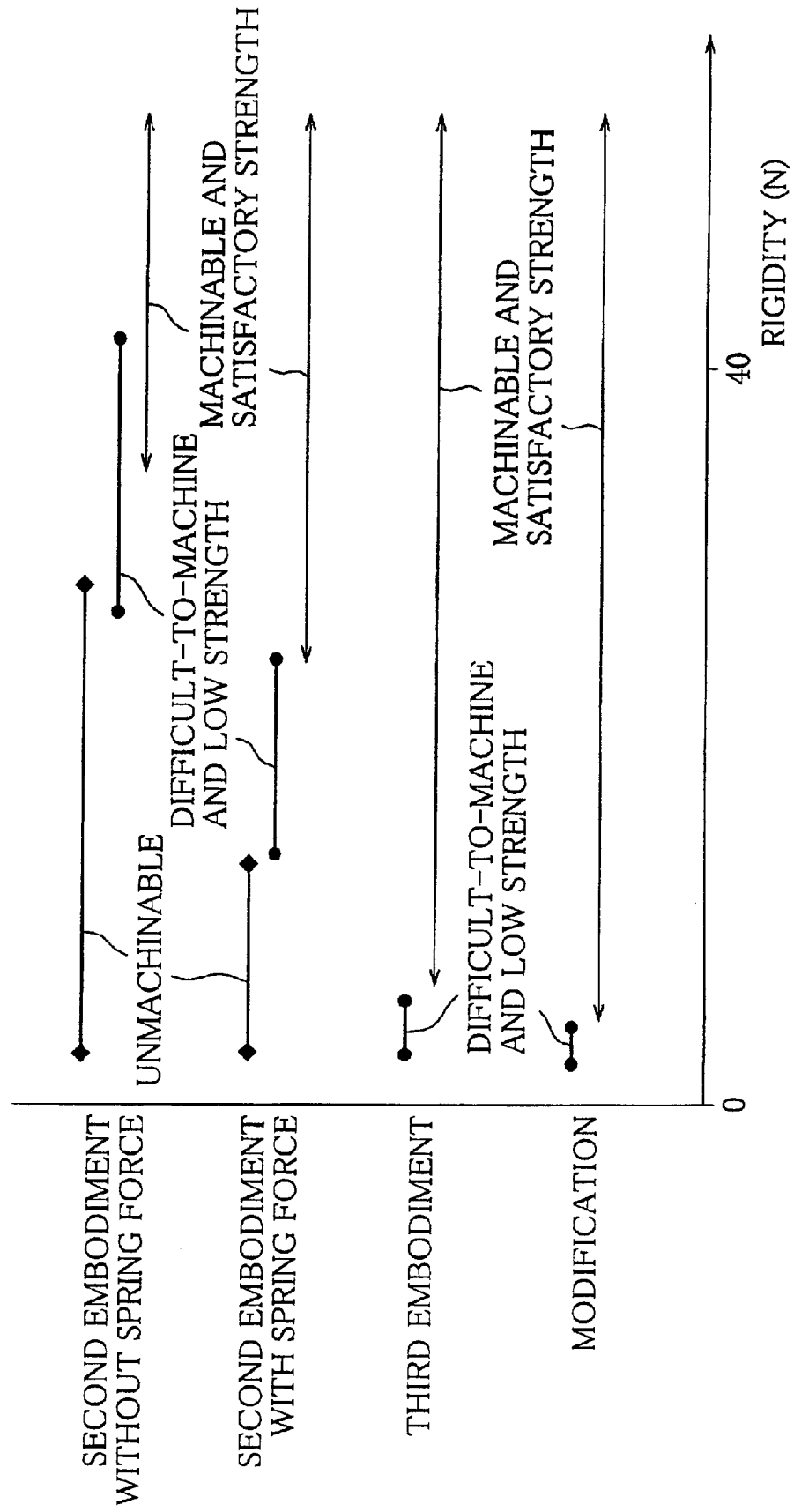
FIG. 31 is a view showing a relationship between rigidity of a tip end member half of a contact, machinability, and mechanical strength of the contact in respect of the contacts according to the second and third embodiments of the present invention.

FIG. 31 shows a relationship between rigidity of the tip end member half of the contact, machinability, and mechanical strength of the contact. At the uppermost part in FIG. 31, the relationship as for the feeding tip according to the second embodiment that is formed with the crosswise slit but lacks the provision of a spring member. The relationship shown in the uppermost but one part corresponds to the case where a spring member is provided in the just-mentioned contact, the relationship shown in the third part from above corresponds to the contact 352 according to the third embodiment that is formed with a straight slit, and the relationship shown in the lowermost part corresponds to the contact 352' according to the modification. In FIG. 31, symbol ←—→ denotes a zone in which the contact has a satisfactory mechanical strength and machinability, ●—● indicates a zone in which the contact has excessively poor mechanical strength and is difficult to machine, and ◆—◆ indicates a zone where the contact is unmachinable.

As apparent from FIG. 31, the contact having a crosswise slit according to the second embodiment is unmachinable in a zone where the rigidity of the tip end member is less than about 28 N or about 13 N, whereas the contact having a straight slit according to the third embodiment or its modification is difficult to machine in a rigidity zone less than about 4 N or about 6 N but machinable and excellent in mechanical strength in the other rigidity ranges.

Figure 32:
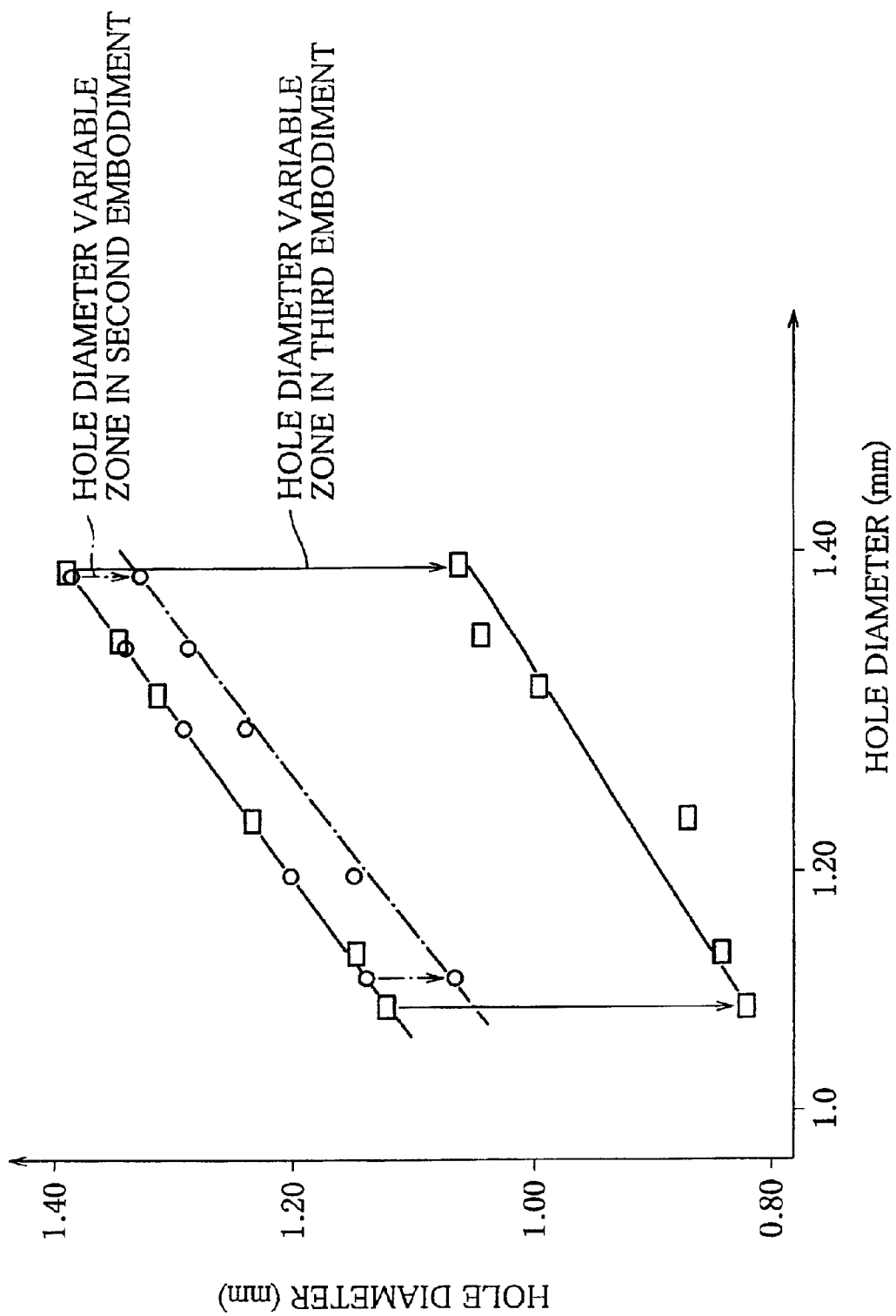
FIG. 32 is a view showing a variable range of effective hole diameter of a wire insertion hole before and after a spring member being mounted to a tip end member in connection with the contact according to the third embodiment.

FIG. 32 shows a variable zone of an effective hole diameter of the wire insertion hole 353, which diameter decreases after the spring member 358 is mounted to the tip end member 364 of the contact 352. In FIG. 32, □ mark corresponds to the contact of the third embodiment and ○ mark corresponds to that of the second embodiment.

As understood from FIG. 32, the contact 352 with the straight slit of the third embodiment provides the first half 366 of the tip end member 364 with low rigidity and hence the variable range of the effective-diameter of the wire insertion hole 353 is extremely increased by the spring force of the spring member 358 to be about five to six times as wide as the variable range of the contact with the crosswise slit of the second embodiment. This indicates that the contact 352 of the third embodiment has a wider permissible wearout range and excellent durability.

Figure 33:
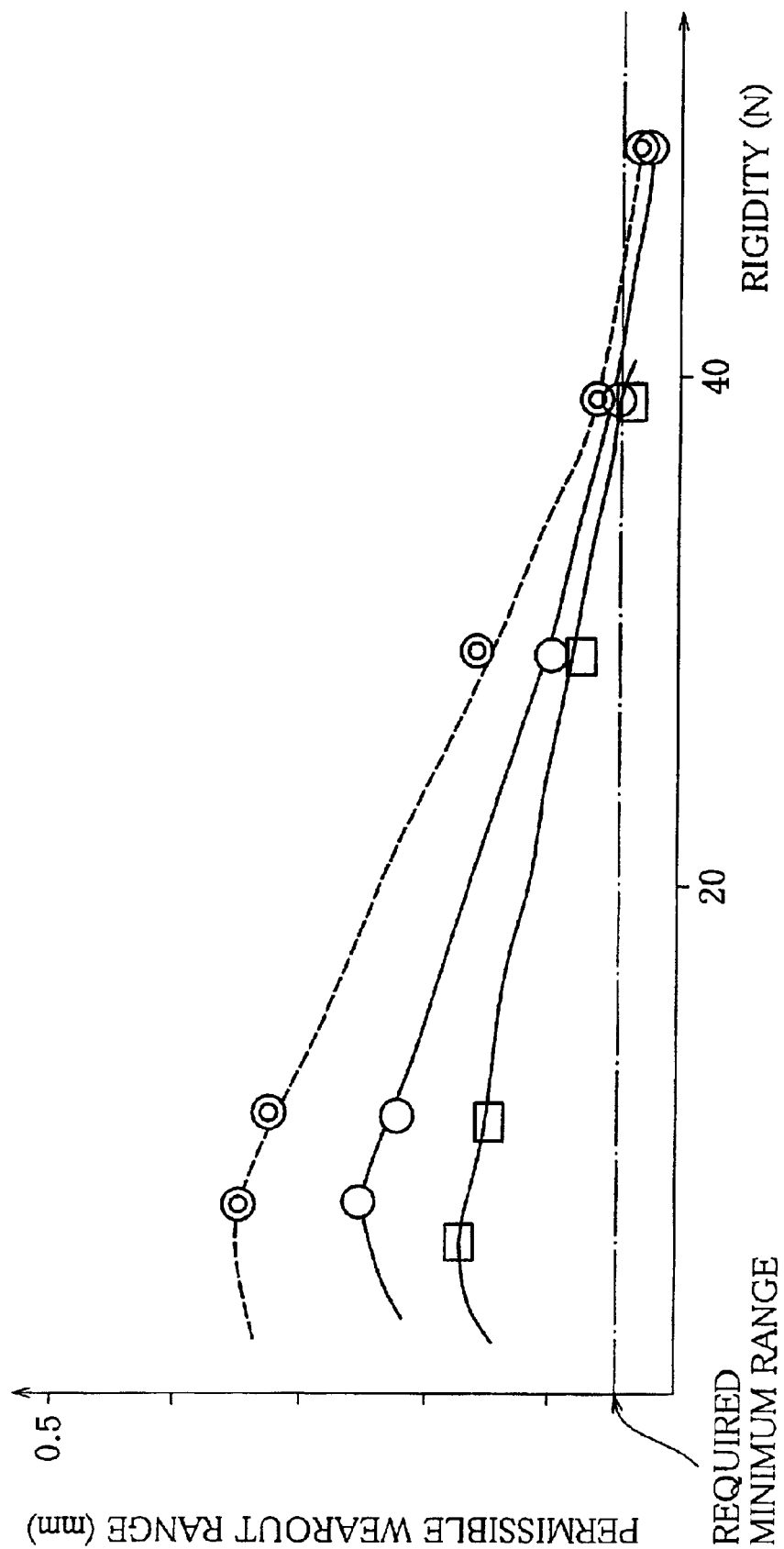
FIG. 33 is a view showing a relationship between rigidity of a first half of a tip end member and a permissible friction range of a wire insertion hole in connection with the contact according to the third embodiment.

FIG. 33 shows the relationship between the rigidity of the first half 366 of the tip end member 364 and the permissible wearout range in the contact 352 according to the third embodiment. In FIG. 33, □ mark indicates results of experiments conducted under welding conditions that the welding wire 306 of YGW16 type having 0.9 mm diameter was used, and welding current, voltage, and wire extension length (distance between contact point and wire distal end) were 150 Å, 20 V and 22 mm, respectively, ○ mark indicates experimental results obtained under the conditions that the welding wire of YGW16 type having 1.2 mm diameter was used, with the welding current of 250 Å, welding voltage of 26V and wire extension length of 28 mm, and ⊙ mark represents experimental results obtained under the conditions such that the welding wire was of YGW11 type and 1.6 mm in diameter, with the welding current of 350 Å, welding voltage of 38 V and wire extension length of 35 mm.

As understood from FIG. 33, the permissible wearout range wider than the required minimum range is obtainable, if the tip end member half 366 has the rigidity equal to or less than 39.2 N. The contact 352 having such a tip end member half permits the contact to contact with the welding wire with an appropriate contact force even when the contact is considerably worn out. Thus, the contact is excellent in durability.

According to similar experiments on conventional contacts (not shown), contacts whose rigidity equal to or greater than 39.2 N were excessively large in wire supply resistance although they could provide the required permissible wearout range. On the other hand, contacts having their rigidity less than 39.2 N produced an excessively small contact force, resulting in an unstable arc. Contrary to this, the contact of the third embodiment prevents the wire supply resistance from being excessively large, while ensuring the required permissible wearout range.

Figure 34:
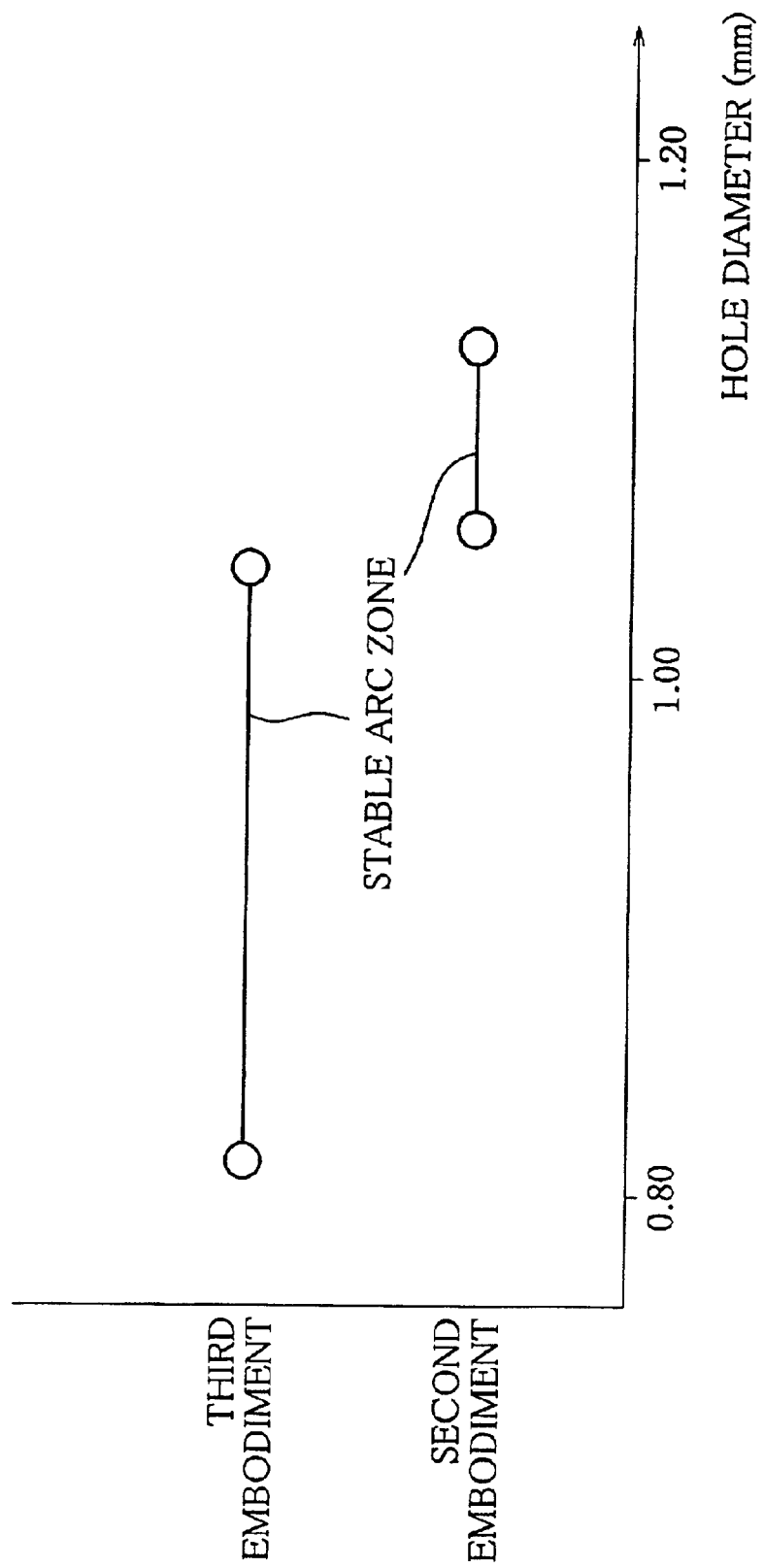
FIG. 34 is a view showing a relationship between hole diameter of a wire insertion hole and arc stability under a spring-member mounted state in connection with the contact according to the third embodiment of this invention.

FIG. 34 shows the relationship between the hole diameter of the wire insertion hole formed in the contact 352 and the degree of arc stability in respect of the contact 352 having the straight slit of the third embodiment and the contact having the crosswise slit of the second embodiment, which relationship was determined by conducting tests wherein both the tips were mounted with the spring member 358, the welding wire was of YGW16 having 1.2 mm diameter, and the welding current and voltage were set at 250 Å and 31 V, respectively. In FIG. 34, ○ mark indicates a stable arc.

As understood from FIG. 34, the contact 352 of the third embodiment can produce a stable arc in a broad hole diameter range varying from 0.82 mm to 1.04 mm, whereas the contact of the second embodiment can produce stable arc in a considerably narrow hole diameter range from 1.06 mm to 1.12 mm.

Figure 35:
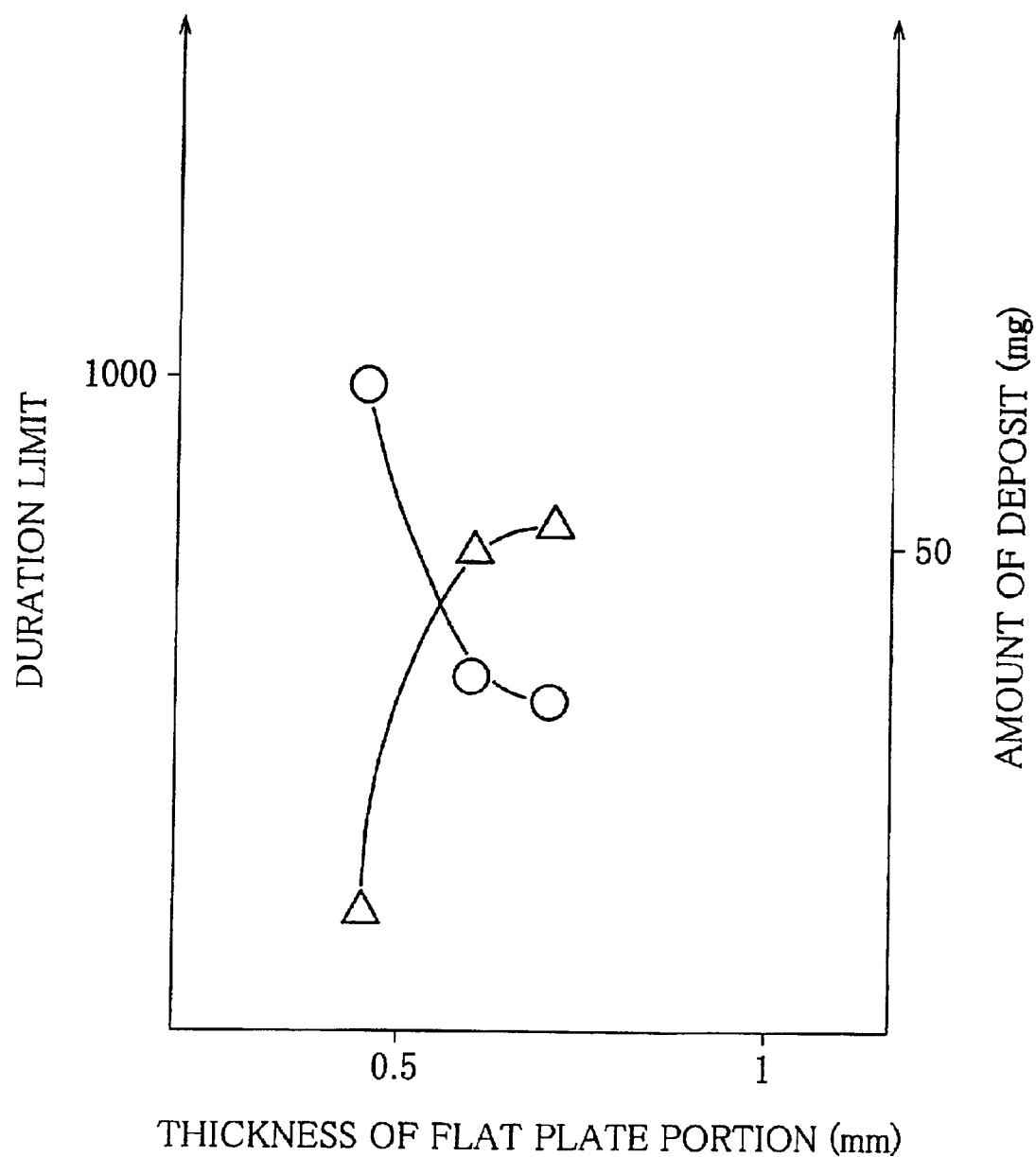
FIG. 35 is a view showing a relationship between thickness of a plate portion of a first half of a tip end member, duration limit and amount of deposit in contact in connection with the contact according to the third embodiment.

In FIG. 35, ○ mark shows the relationship between the thickness of the flat plate portion 366a of the first half 366 of the tip end member 364 and the durability limit in respect of the contact 352 of the third embodiment, and Δ mark shows the relationship between the thickness of the flat plate portion and an amount of deposit in respect of the contact 352. As for the contacts individually having flat plate thicknesses of 0.7 mm and 0.60 mm and formed with no discharge hole 366c, the durability limits are 500 times and 550 times, and the amounts of deposit are 55 mg and 50 mg, respectively. Contrary to this, as for the contact having the flat plate thickness of 0.45 mm and formed with the discharge hole, the durability limit is 1,000 times and the amount of deposit is 12 mg. The aforesaid durability limit of the contact was determined by using a method which will be described in connection with the below-mentioned durability test.

The foregoing experimental results indicate that the contact having the flat plate thickness falling within a range varying from 0.45 mm to 0.7 mm is excellent in both the durability and deposit discharging ability, and indicate that the contact, which is small in flat plate thickness, has appropriately decreased rigidity of the first half 366 of the tip end member 364, and is formed at the flat plate portion 366a with the discharge hole 366c, is capable of further improving the durability and reducing the amount of deposit.

Figure 36:
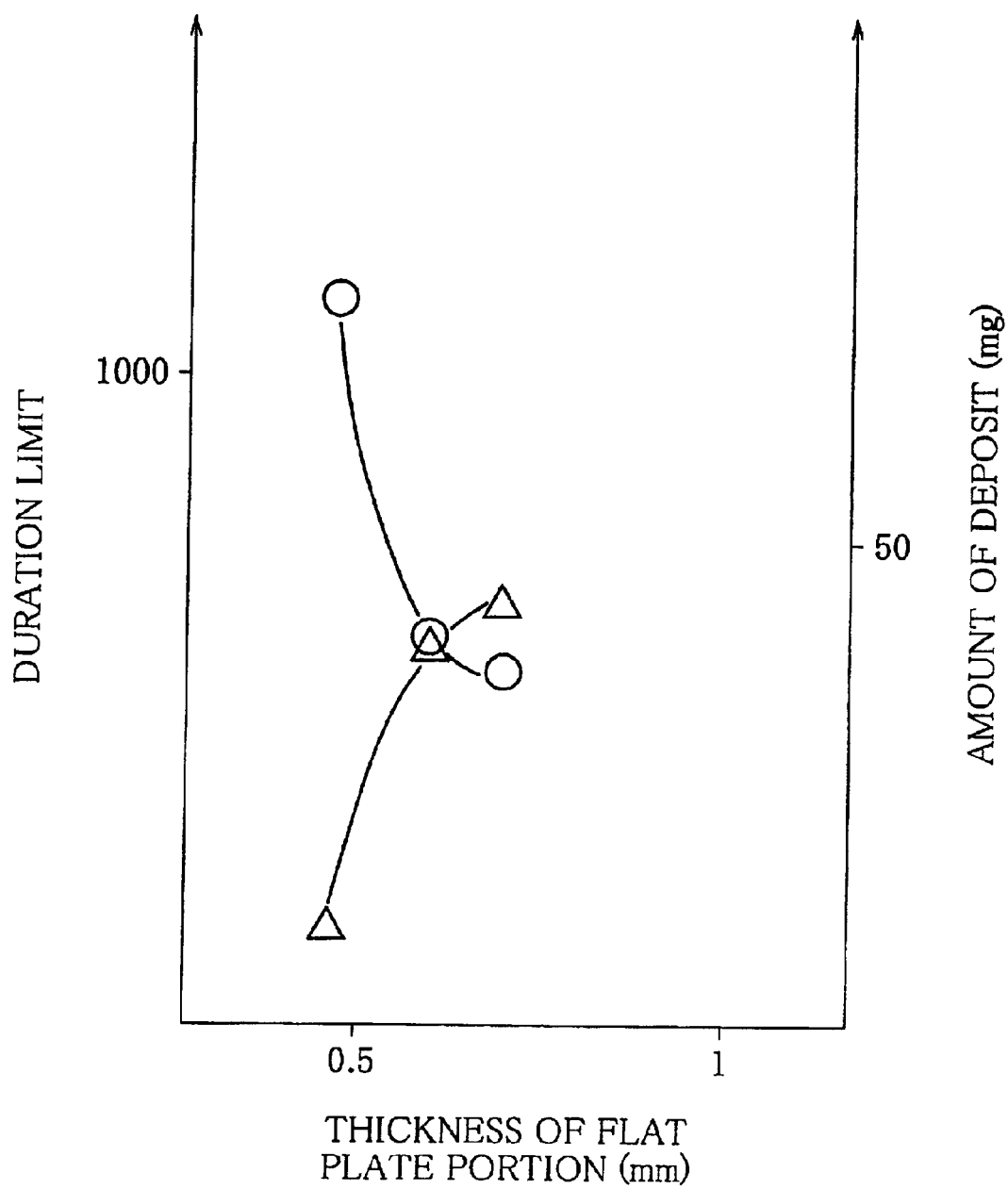
FIG. 36 is a view, similar to FIG. 35, in connection with a contact according to a modification of the third embodiment.

FIG. 36 shows a similar relationship regarding the contact 352' according to the aforesaid modification for the cases where the thickness of the flat plate portion of each of the first and second halves 366, 368 of the tip end member was set at 0.7 mm, 0.6 mm and 0.45 mm, respectively. The experimental results indicate a tendency similar to that shown in FIG. 35. Namely, improved durability of the feeder and a reduced amount of deposit can be attained by reducing the thickness of the flat plate portion and by forming the discharge hole in the flat plate portion.

Figure 37:
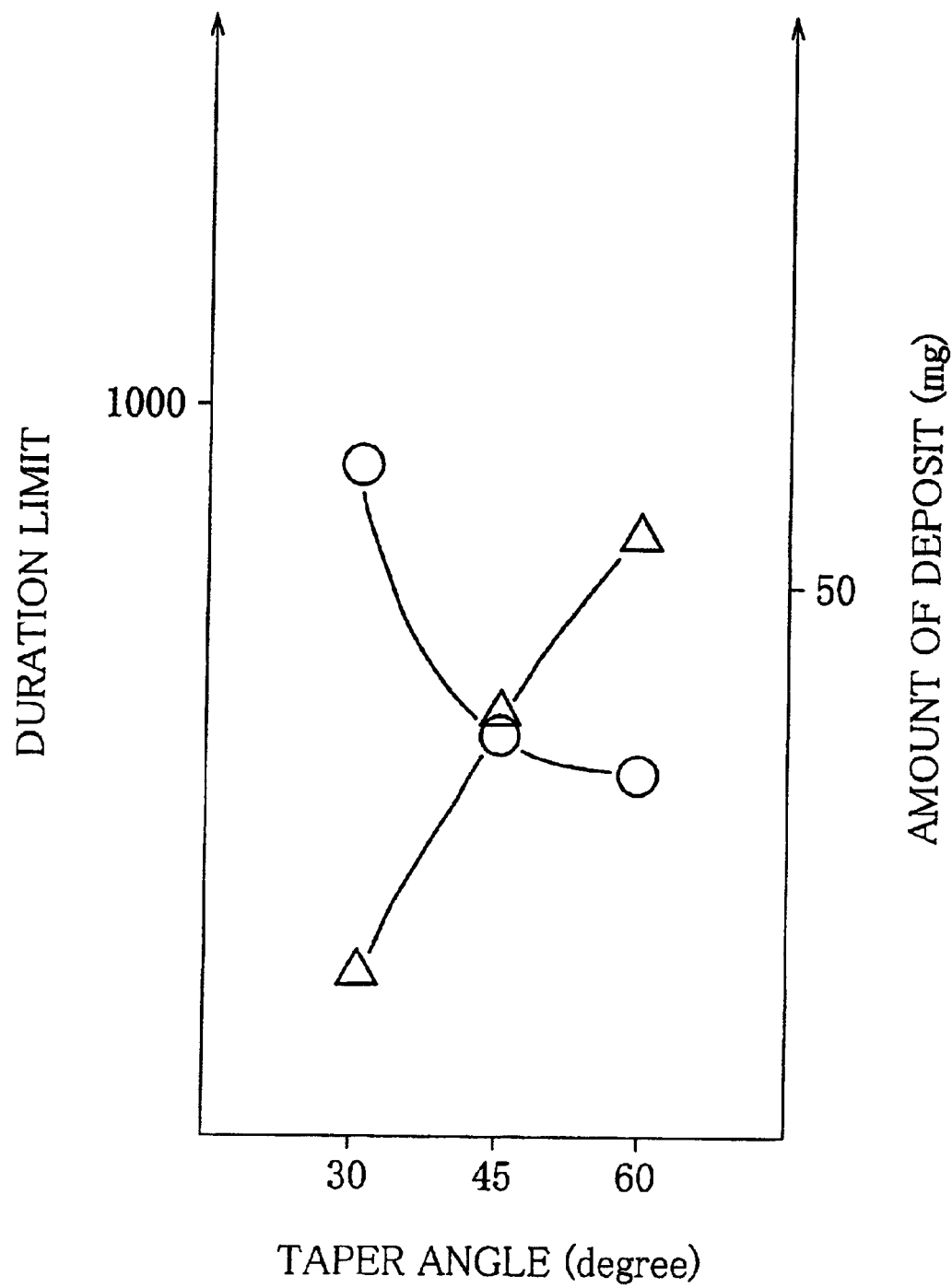
FIG. 37 is a view showing a relationship between taper angle of a wire insertion hole, duration limit and amount of deposit in connection with the third embodiment.

In FIG. 37, ○ mark shows, for the taper angles of 30, 45 and 60 degrees, the relationship between the taper angle θ of the wire insertion hole 353 and the durability limit of the contact 352 of the third embodiment whose tip end member 364 has the first half 366 which is 0.70 mm in thickness at the flat plate portion 366a and whose wire insertion hole 353 has the hole diameters of 1.60 mm and 1.20 mm at the upstream and downstream sides of the taper portion 353a, whereas Δ mark shows the relationship between the taper angle θ and the amount of deposit. As understood from FIG. 37, the contact having the taper angle of 45 degrees is superior in durability and deposit discharging ability to the contact whose taper angle is 60 degrees. The contact having a taper angle of 30 degrees is further improved in durability and deposit discharging ability.

Figure 38:
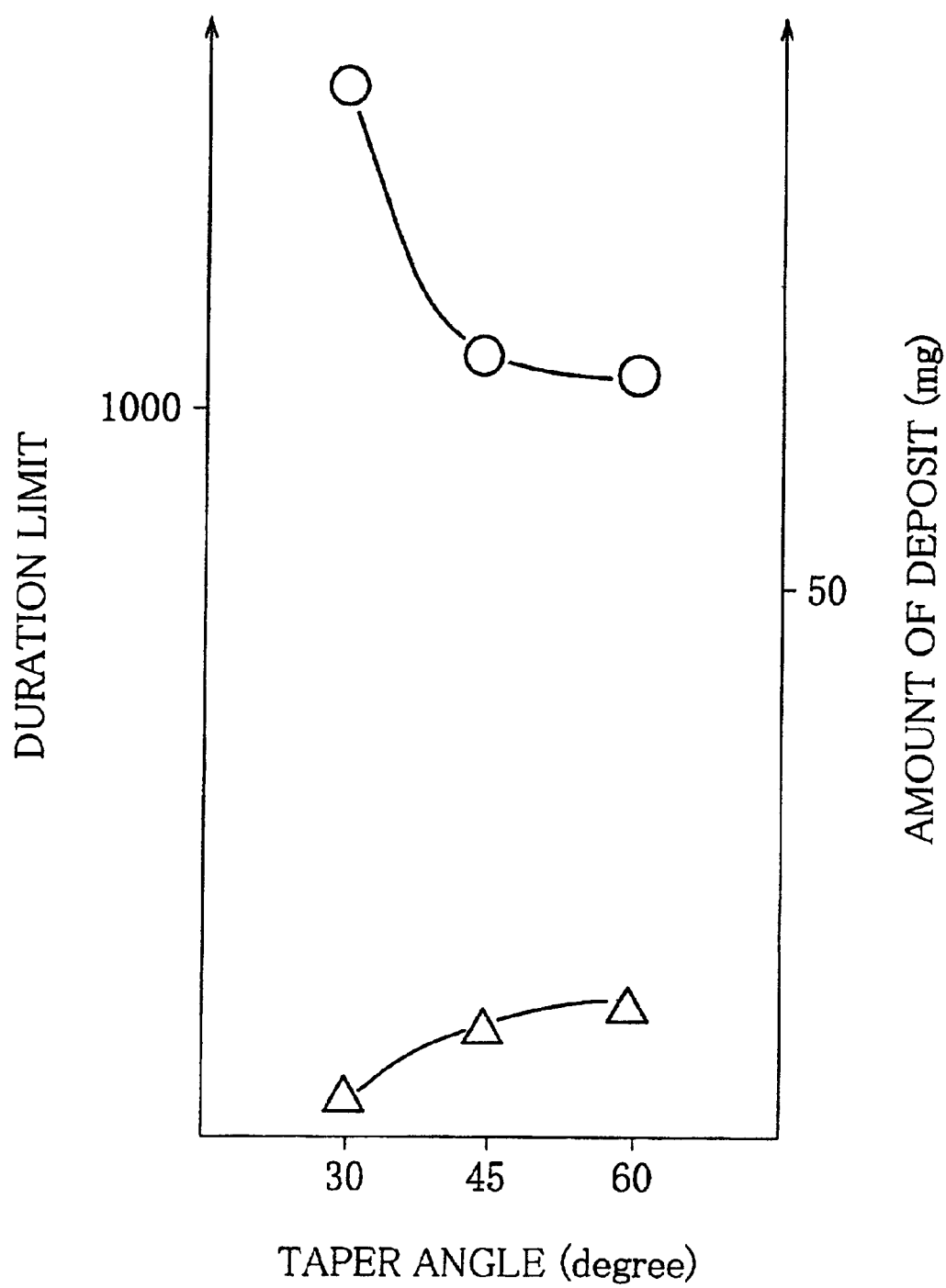
FIG. 38 is a view, similar to FIG. 37, in connection with a modification of this invention.

FIG. 38 shows similar relationships for the contacts 352' according to the foregoing modification whose tip end member has the first and second halves thereof having flat plate portions 366a, 368'a each of which is 0.45 mm in thickness and whose wire insertion hole has hole diameters of 1.60 mm and 1.20 mm at the upstream and downstream sides of the taper portion. FIG. 38 indicates that the durability limit increases and the amount of deposit decreases with the decrease in taper angle, and indicates that the contact 352' according to the modification is superior in durability and deposit discharging ability to the contact 352 according to the third embodiment.

Figure 39:
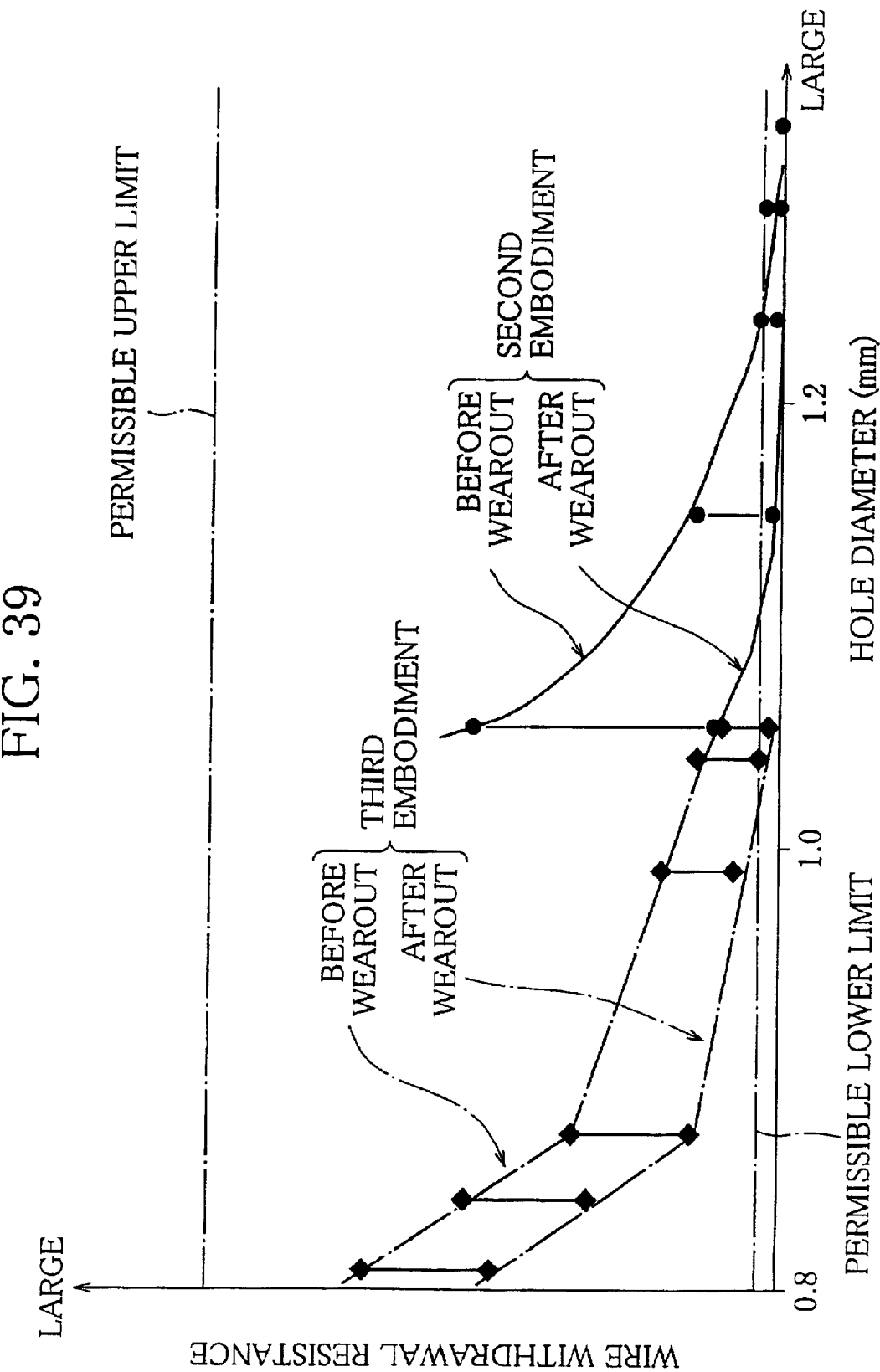
FIG. 39 is a view showing a relationship between a change in wire withdrawal resistance as a wire insertion hole of a contact being worn out and hole diameter of the wire insertion hole in connection with the first and fourth embodiments of this invention.

FIG. 39 shows the relationship between a change in wire withdrawal resistance as the wire insertion hole of the contact is worn out and the hole diameter of the wire insertion hole in connection with the contact 352 having the straight slit according to the third embodiment and the contact formed with the crosswise slit according to the second embodiment, when the welding wire of YGW12 having 1.2 mm diameter is used. The first half 366 of the tip end member of the contact of the third embodiment has its rigidity of about 11 N, whereas each of four portions, divided by the crosswise slit, of the tip end member of the contact of the second embodiment has its rigidity of about 34 N. In FIG. 39, ♦ and ● marks correspond to the contacts according to the third and second embodiments, respectively, and indicate that the wire withdrawal resistance decreases as the contact is worn out. In FIG. 39, the diameter of the wire insertion hole in a condition that the spring member is mounted to the tip end member of the contact is taken along abscissa.

As understood from FIG. 39, the contact of the third embodiment permits, in a broad hole diameter range from about 0.80 mm to about 1.04 mm, the wire withdrawal resistance to change before and after wearout of the contact within a permissible range where stable wire supply can be attained. On the other hand, in the contact according to the second embodiment, the wire withdrawal resistance observed when the contact is worn out decreases to a value less than a permissible lower limit in the hole range which is equal to or greater than about 1.125 mm. The above indicates that the contact according to the third embodiment can apply the required wire withdrawal resistance even when the contact is considerably worn out, thereby ensuring stable wire supply.

In the following, functions of the arc welding apparatus, especially the welding tip of the third embodiment, will be explained.

In the arc welding apparatus, the welding wire 306 is supplied from the wire supply apparatus 308 to the interior of the welding torch 304, and is further supplied into the wire insertion hole 353 formed in the contact 352 of the welding tip 344 mounted to the welding torch body 342. On the other hand, a shield gas is supplied from the gas supplying apparatus 312 to a gap between the welding tip 344 and the nozzle 346 mounted to the welding torch 304. Also, electric power is supplied from the welding power source 310 to the contact 352, thus generating an arc between the distal end of the welding wire and the base material, whereby welding is performed using arc heat.

During the welding, the welding wire 306 supplied to the large-diameter portion of the wire insertion hole that extends from the tip body 362 of the contact 352 to an intermediate portion of the tip end member 364 is then supplied to a small-diameter portion of the wire insertion hole via the taper portion 353a of the wire insertion hole 353. Since the wire insertion hole is smaller in diameter on the downstream side of the taper portion than the welding wire diameter, the welding wire 306 passes through the taper portion 353a while causing the first half 366 of the tip end member to move radially outward of the contact around a coupling portion or connection between the flat plate portion 366a of the first half and the tip body 362, in a condition that a spring force acting radially inward is applied by the spring member 358 to the first half 366. Since the rigidity of the first half 366 and the spring force produced by the spring member 358 are adjusted to appropriate values in advance, the first half 366 of the tip end member is held to be in contact with the welding wire 306 with an appropriate force. Thus, heating is prevented which would otherwise occur if the rigidity of the first half 366 is excessively small so that the first half may be in contact with the welding wire 306 with an excessively large force under the action of the spring member 358, and at the same time unstable power supply or power supply failure can be prevented which would otherwise occur due to excessively large rigidity.

As a result, the position of the contact point at which the contact 352 contacts with the welding wire 306 is stabilized, whereby a stable arc and improved durability of the contact can be attained. Furthermore, the deposit in the wire insertion hole on the side close to the tip body of the contact 352 is discharged through the slit 355 that communicates with the wire insertion hole. As a consequence, there is no fear that the wire supply is hindered by accumulated deposits. In addition, the taper angle θ of the wire insertion hole 353 that is equal to or less than 45 degrees promotes the discharging of deposit.

The function of the contact according to the modification is basically the same as that of the third embodiment, and hence explanations thereof are omitted herein.

The present inventors examined the durability of the contact according to the third embodiment.

A semi-automatic arc welding apparatus provided with the contact of the third embodiment was fabricated, and bead-on drum welding onto a water-cooled drum was carried out with use of the thus fabricated welding apparatus. Such welding was performed for 180 welding cycles each consisting of two-minute welding and 30-second rest. During the welding, the welding current was measured for every ten welding cycles.

Primary welding conditions in the durability test were as follows:

| | |
|---|---|
| Welding wire | DD50S of 1.2 mm diameter |
| Shield gas | Ar + 20% $CO_2$ |
| Welding current | 250 A |
| Wire supply speed | 1105 cm/min |
| Arc voltage | 29 V |

A similar welding test was made under the same conditions with use of a semi-automatic arc welding apparatus provided with a conventional contact, with the exception that the wire supply speed was 890 cm/min.

Figure 40:
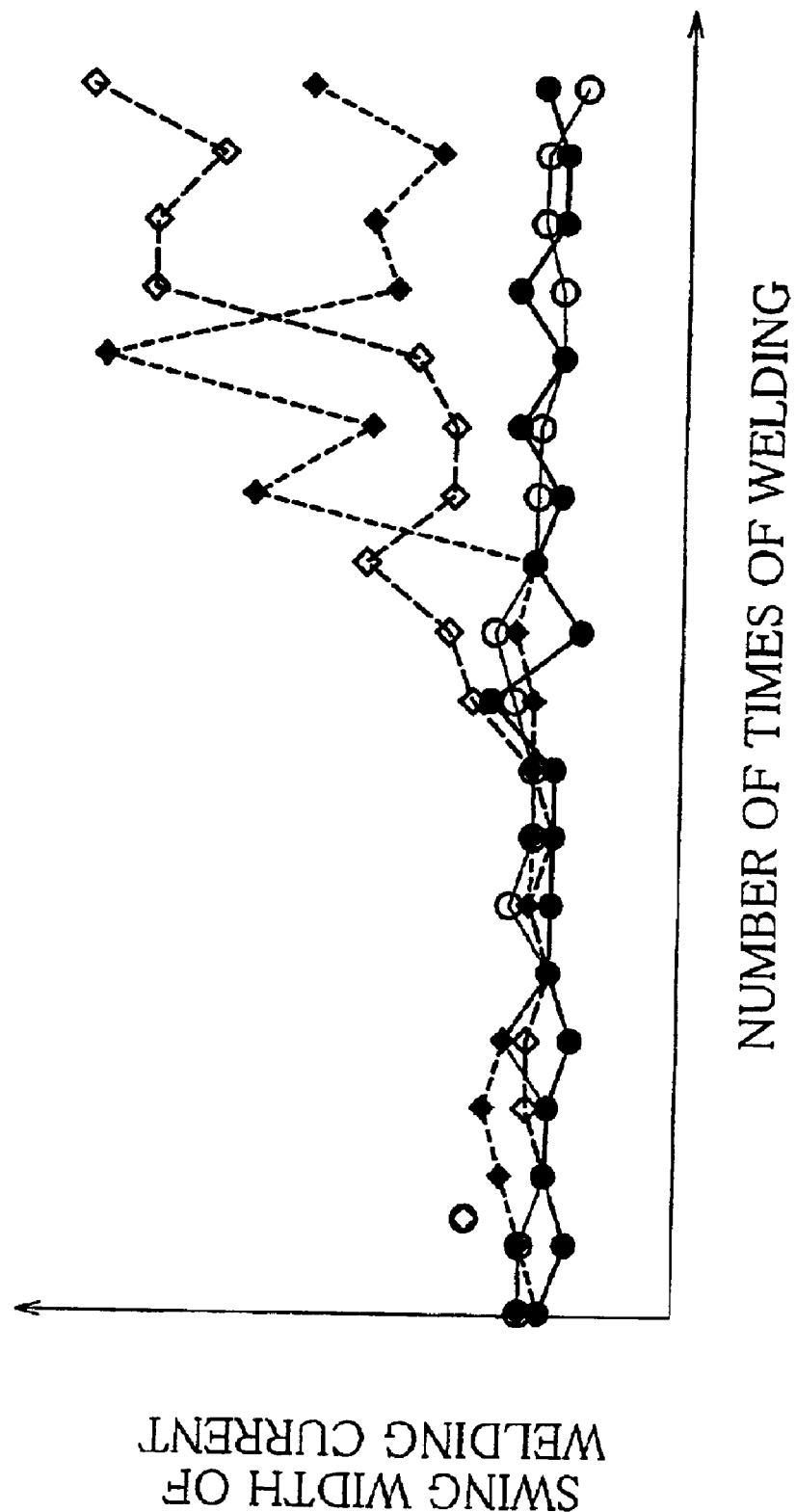
FIG. 40 is a view showing relationships between number of times of welding and swing amplitude of welding current in connection with a contact according to the third embodiment of this invention and a conventional contact.

FIG. 40 shows results of the durability tests. In FIG. 40, ○ and ● marks indicate the relationship between the number of times of welding and the swing width or deflection of welding current for the contact 352 of the third embodiment, whereas ◇ and ◆ marks show a similar relationship for the conventional contact. Marks ● and ◆ represent measured values for the case where a conduit cable is moved for every ten welding cycles from a cable-fixture position to another cable-fixture position that form an angle of 60 degrees therebetween. As understood from FIG. 40, the swing width of welding current increases after 90 welding cycles were reached in the case of the conventional contact, whereas no substantial change occurred in the swing width of welding current during 180 welding cycles in the case of the contact 352 of the third embodiment. This indicates that power feed to the welding wire through the contact 352 was stabilized, and in other words, the contact of the third embodiment is excellent in durability.

Hereinabove, the arc welding apparatus having the welding tip according to the first to third embodiments and modifications thereof has been explained. The arc welding apparatus of this invention can be configured in the form of a semi-automatic welding apparatus whose welding torch is held by an operator or in the form of an automatic welding apparatus whose welding torch, wire supply apparatus, welding power source, etc. are mounted on a running carriage, and further can be constituted in the form of non-gas shielded type having no gas supplying apparatus. Moreover, the robot body of the arc welding apparatus is not essentially required to have an articulated robot shown by way of example in FIG. 23. For instance, the robot body may be comprised of a first slider on which the welding torch is supported for linear reciprocal movement and a second slider that supports the first slider for vertical movement. Such robot body can be used in combination with a base material base on which a base material is supported for reciprocal motion along the direction perpendicular to the moving axis of the welding torch.

As pointed out previously, it is not inevitably necessary to divide the tip end member of the contact into two part as in the case of the third embodiment. For instance, the tip end member may be divided into four part as in the case of the second embodiment. In that case, at least one divided part of the tip end member is configured to have the required rigidity. To this end, divided parts of the tip end member may be machined circumferentially to decrease the wall thickness thereof.

The respective features of the first, second and third embodiment may be combined variously. For instance, the distal end of the insulating guide of the third embodiment may be projected from the distal end face of the metal guide by a predetermined distance L and the clearance G between the contact and the insulating guide may be provided that falls within a predetermined clearance range, as in the case of the first embodiment.

What is claimed is:

1. A welding tip for arc welding comprising:
    a contact formed with a wire insertion hole permitting a welding wire to pass therethrough and adapted to be mounted to a welding torch body,
    a metal guide mounted to a distal end of the contact, and
    an insulating guide accommodated in the metal guide and formed with a wire guide hole permitting the welding wire to pass therethrough, wherein the contact comprises a tip body adapted to be mounted to the welding torch body and a tip end member formed integrally with the tip body;

wherein the tip end member is divided into at least first and second parts by at least one slit formed along an axis of the tip end member over an entire length thereof and communicating with the wire insertion hole; and wherein a spring member is fitted on the tip end member to apply a spring force to the tip end member; and wherein a distal end of the insulating guide projects from a distal end of the metal guide.

2. The welding tip according to claim 1, wherein the spring member comprises a plate spring formed into a cylindrical shape.

3. The welding tip according to claim 1, wherein a wall is formed on an outer periphery of the contact and the wall projects to form an abutment face on a distal end side with respect to the spring member, and wherein a distal end face of the spring member is abutted against the wall.

4. The welding tip according to claim 1, wherein a projection length of the insulating guide varies from 0.5 mm to 2.0 mm.

5. An arc welding apparatus comprising the welding tip as set forth in claim 1.

6. A welding tip for arc welding comprising:

a contact formed with a wire insertion hole which permits a welding wire to pass therethrough and adapted to be mounted to a welding torch body, a metal guide mounted to a distal end of the contact, and an insulating guide accommodated in the metal guide and formed with a wire guide hole which permits the welding wire to pass therethrough, wherein the contact comprises a tip body adapted to be mounted to the welding torch body and a tip end member formed integrally with the tip body;

wherein the tip end member is divided into at least first and second parts by at least one slit formed along an axis of the tip end member over an entire length thereof and communicating with the wire insertion hole;

wherein a spring member is fitted on the tip end member to apply a spring force to the tip end member;

wherein the spring member permits the slit to have a distal end width of less than 0.3 D, where D represents a welding wire diameter;

wherein a wire withdrawal resistance F varies within a range from 10 D to 2000 D inclusive; and wherein the insulating guide is disposed close to or in contact with the contact so as block weld fume; and wherein a distal end of the insulating guide projects from a distal end of the metal guide.

7. The welding tip according to claim 6, wherein a clearance equal to or less than 0.1 D is formed between the contact and the insulating guide.

8. The welding tip according to claim 6, wherein the wire insertion hole has a stepped structure comprising:

a small-diameter portion located on a side close to the insulating guide and having an inner diameter substantially equal to the welding wire diameter, and a large-diameter portion located on a side remote from the insulating guide, having an inner diameter larger than that of the small-diameter portion, and extending to a proximal end of the slit.

9. An arc welding apparatus comprising the welding tip as set forth in claim 6.

10. A welding tip comprising:

a contact formed with a wire insertion hole which permits a welding wire to pass therethrough and adapted to be mounted to a welding torch body, a metal guide mounted to a distal end of the contact, and an insulating guide accommodated in the metal guide and formed with a wire guide hole which permits the welding wire to pass therethrough, wherein the contact comprises a tip body adapted to be mounted to the welding torch body and a tip end member formed integrally with the tip body;

wherein the tip end member is divided into at least first and second parts by at least one slit formed along an axis of the tip end member over an entire length thereof and communicating with the wire insertion hole;

wherein the first part has a predetermined rigidity and is movable around a connection between the first part and the tip body;

wherein a spring member is fitted on the tip end member to apply a spring force to the tip end member; and wherein a distal end of the insulating guide projects from a distl end of the metal guide.

11. The welding tip according to claim 10, wherein the tip end member comprises first and second parts, and the second part has a predetermined rigidity and is movable around a connection between the second part and the tip body.

12. The welding tip according to claim 10, wherein the rigidity of the first part of the tip end member varies within a range from 3.92 N to 39.2 N inclusive.

13. The welding tip according to claim 11, wherein the rigidity of the first part of the tip end member and the rigidity of the second part of the tip end member each vary within a range from 3.92N to 39.2 N inclusive.

14. The welding tip according to claim 10, wherein a discharge hole is formed in an upstream portion of the first part of the tip end member as viewed in a welding wire supplying direction.

15. The welding tip according to claim 11, wherein discharge holes are provided at upstream portions of the first and second parts of the tip end member as viewed in a welding wire feeding direction.

16. The welding tip according to claim 10, wherein the wire insertion hole is provided with a taper portion on a downstream side of the discharge hole, and the taper portion has a diameter that becomes smaller toward a downstream side in a welding wire supplying direction.

17. The welding tip according to claim 16, wherein a taper angle at the taper portion of the wire insertion hole of the contact is equal to or less than 45 degrees.

18. An arc welding apparatus comprising:

a welding torch having a welding torch body mounted with the welding tip as set forth in claim 10;

a wire feeding apparatus for supplying the welding wire to the welding torch; and a weld power source for supplying the contact of the welding tip with electric power.

19. An arc welding apparatus comprising the welding tip as set forth in claim 2.

20. An arc welding apparatus comprising the welding tip as set forth in claim 3.

21. An arc welding apparatus comprising the welding tip as set forth in claim 10.

22. An arc welding apparatus comprising the welding tip as set forth in claim 4.

23. An arc welding apparatus comprising the welding tip as set forth in claim 7.

24. An arc welding apparatus comprising the welding tip as set forth in claim 8.

25. An arc welding apparatus comprising:
   a welding torch having a welding torch body mounted with the welding tip as set forth in claim 11;
   a wire feeding apparatus for supplying a welding wire to the welding torch; and
   a weld power source for supplying the contact of the welding tip with electric power.

26. An arc welding apparatus comprising:
   a welding torch having a welding torch body mounted with the welding tip as set forth in claim 12;
   a wire feeding apparatus for supplying a welding wire to the welding torch; and
   a weld power source for supplying the contact of the welding tip with electric power.

27. An arc welding apparatus comprising:
   a welding torch having a welding torch body mounted with the welding tip as set forth in claim 13;
   a wire feeding apparatus for supplying a welding wire to the welding torch; and
   a weld power source for supplying the contact of the welding tip with electric power.

28. An arc welding apparatus comprising:
   a welding torch having a welding torch body mounted with the welding tip as set forth in claim 14;
   a wire feeding apparatus for supplying a welding wire to the welding torch; and
   a weld power source for supplying the contact of the welding tip with electric power.

29. An arc welding apparatus comprising:
   a welding torch having a welding torch body mounted with the welding tip as set forth in claim 15;
   a wire feeding apparatus for supplying a welding wire to the welding torch; and
   a weld power source for supplying the contact of the welding tip with electric power.

30. An arc welding apparatus comprising:
   a welding torch having a welding torch body mounted with the welding tip as set forth in claim 16;
   a wire feeding apparatus for supplying a welding wire to the welding torch; and
   a weld power source for supplying the contact cf the welding tip with electric power.

31. An arc welding apparatus comprising:
   a welding torch having a welding torch body mounted with the welding tip as set forth in claim 17;
   a wire feeding apparatus for supplying a welding wire to the welding torch; and
   a weld power source for supplying the contact of the welding tip with electric power.

* * * * *